(12) United States Patent
Hassler

(10) Patent No.: US 12,219,019 B2
(45) Date of Patent: *Feb. 4, 2025

(54) METHODS AND SYSTEMS FOR SESSION MANAGEMENT

(71) Applicant: Comcast Cable Communications, LLC, Philadelphia, PA (US)

(72) Inventor: Garey Hassler, Castle Pines, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 552 days.

This patent is subject to a terminal disclaimer.

(21) Appl. No.: 17/501,980

(22) Filed: Oct. 14, 2021

(65) Prior Publication Data

US 2022/0103641 A1 Mar. 31, 2022

Related U.S. Application Data

(63) Continuation of application No. 16/188,233, filed on Nov. 12, 2018, now Pat. No. 11,190,598.

(60) Provisional application No. 62/753,612, filed on Oct. 31, 2018.

(51) Int. Cl.
*G06F 15/16* (2006.01)
*H04L 67/02* (2022.01)
*H04L 67/141* (2022.01)
*H04L 67/142* (2022.01)
*H04L 67/55* (2022.01)

(52) U.S. Cl.
CPC ............ *H04L 67/142* (2013.01); *H04L 67/02* (2013.01); *H04L 67/141* (2013.01); *H04L 67/55* (2022.05)

(58) Field of Classification Search
CPC ..... H04L 67/142; H04L 67/02; H04L 67/141; H04L 67/55
See application file for complete search history.

(56) References Cited

U.S. PATENT DOCUMENTS

| | | |
|---|---|---|
| 6,195,680 B1 | 2/2001 | Goldszmidt et al. |
| 6,377,996 B1 | 4/2002 | Lumelsky et al. |
| 6,772,216 B1 | 8/2004 | Ankireddipally et al. |
| 6,976,085 B1 | 12/2005 | Aviani et al. |
| 7,254,634 B1 | 8/2007 | Davis et al. |
| 7,587,467 B2 | 9/2009 | Hesselink et al. |
| 8,082,591 B2 | 12/2011 | Gu et al. |
| 8,214,862 B1 | 7/2012 | Lee et al. |
| 8,379,668 B2 | 2/2013 | Poder et al. |
| 9,104,882 B2 | 8/2015 | Salinger et al. |
| 9,106,663 B2 | 8/2015 | Patterson et al. |
| 9,608,957 B2 | 3/2017 | Sivasubramanian et al. |
| 10,560,215 B1 | 2/2020 | Hegar |
| 10,630,990 B1 | 4/2020 | Saxton |
| 11,057,446 B2 | 7/2021 | Shribnnan |
| 2004/0059939 A1 | 3/2004 | de Jong |
| 2007/0245010 A1 | 10/2007 | Arn et al. |
| 2008/0222277 A1 | 9/2008 | Park et al. |
| 2009/0287835 A1 | 11/2009 | Jacobson |

(Continued)

*Primary Examiner* — Razu A Miah
(74) *Attorney, Agent, or Firm* — Ballard Spahr LLP

(57) ABSTRACT

Methods and systems for sending data are described. A computing device may send data to one or more requesting devices via one or more communication sessions. The computing device may update a state of a token(s) based on requests received and/or data sent. The computing device may manage the one or more sessions according to the state of the token(s).

24 Claims, 9 Drawing Sheets

(56) References Cited

U.S. PATENT DOCUMENTS

| | | |
|---|---|---|
| 2010/0157882 A1 | 6/2010 | Moriwaki et al. |
| 2011/0082924 A1 | 4/2011 | Gopalakrishnan |
| 2011/0167105 A1 | 7/2011 | Ramakrishnan et al. |
| 2012/0054265 A1 | 3/2012 | Kazerani et al. |
| 2012/0110199 A1* | 5/2012 | Mao .................. H04N 21/2541 709/229 |
| 2013/0007223 A1 | 1/2013 | Luby et al. |
| 2013/0166659 A1 | 6/2013 | Champel et al. |
| 2013/0238799 A1 | 9/2013 | Osamura et al. |
| 2013/0244614 A1 | 9/2013 | Santamaria et al. |
| 2013/0297738 A1 | 11/2013 | Tarkoma |
| 2013/0304851 A1* | 11/2013 | Vance ................ G05B 19/4185 709/224 |
| 2014/0348165 A1* | 11/2014 | Frydman ................ H04L 45/24 370/390 |
| 2015/0012661 A1 | 1/2015 | Elmore |
| 2015/0032856 A1 | 1/2015 | Ishikawa et al. |
| 2015/0067819 A1 | 3/2015 | Shribman et al. |
| 2015/0100631 A1 | 4/2015 | Jenkins et al. |
| 2015/0134967 A1 | 5/2015 | Moore |
| 2015/0172389 A1 | 6/2015 | Michimura et al. |
| 2015/0222670 A1* | 8/2015 | Inoue ................... H04N 21/233 370/261 |
| 2016/0036804 A1 | 2/2016 | Moore |
| 2016/0055188 A1 | 2/2016 | Goel et al. |
| 2016/0057139 A1 | 2/2016 | McDonough et al. |
| 2016/0080252 A1 | 3/2016 | Ramachandran et al. |
| 2016/0119431 A1 | 4/2016 | Bortz et al. |
| 2016/0241910 A1 | 8/2016 | Rowe |
| 2016/0337426 A1 | 11/2016 | Shribman et al. |
| 2016/0380852 A1 | 12/2016 | Kawamori |
| 2017/0011084 A1 | 1/2017 | Goel et al. |
| 2017/0055007 A1 | 2/2017 | Phillips |
| 2017/0078432 A1 | 3/2017 | Miller et al. |
| 2017/0163738 A1 | 6/2017 | Tamura |
| 2017/0163755 A1 | 6/2017 | Slocombe et al. |
| 2018/0139192 A1 | 5/2018 | Pishinov et al. |
| 2018/0227606 A1 | 8/2018 | Fryer et al. |
| 2019/0215361 A1 | 7/2019 | Lohmar |
| 2019/0222619 A1 | 7/2019 | Shribman |
| 2020/0213592 A1 | 7/2020 | Saxton |
| 2020/0351378 A1 | 11/2020 | Shribman |
| 2021/0127151 A1 | 4/2021 | Sengupta |
| 2021/0258158 A1* | 8/2021 | Nelson .................. H04L 9/0861 |

\* cited by examiner

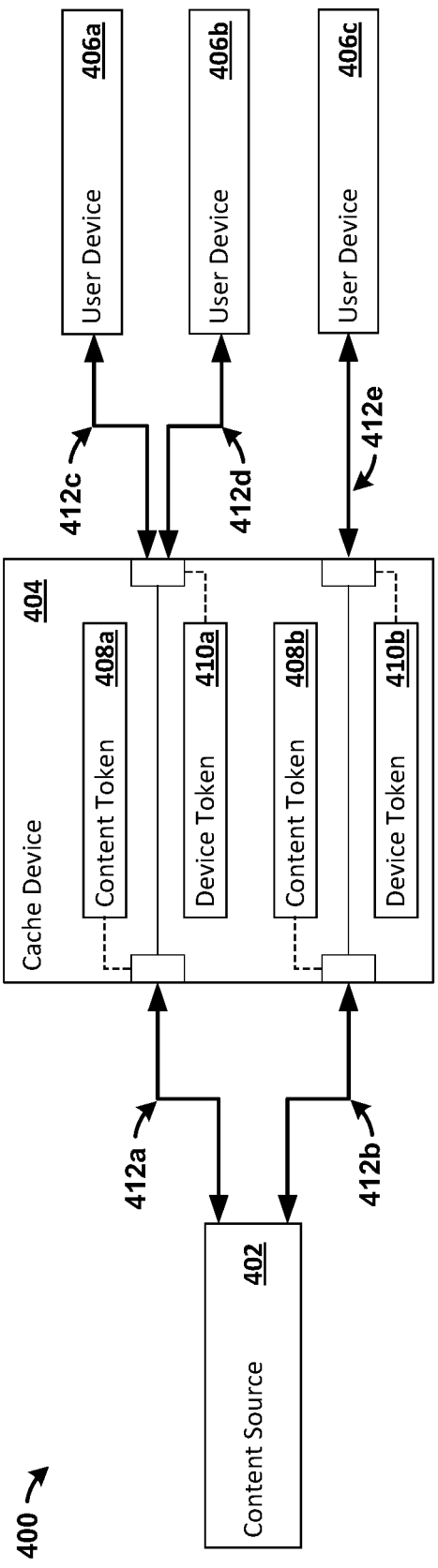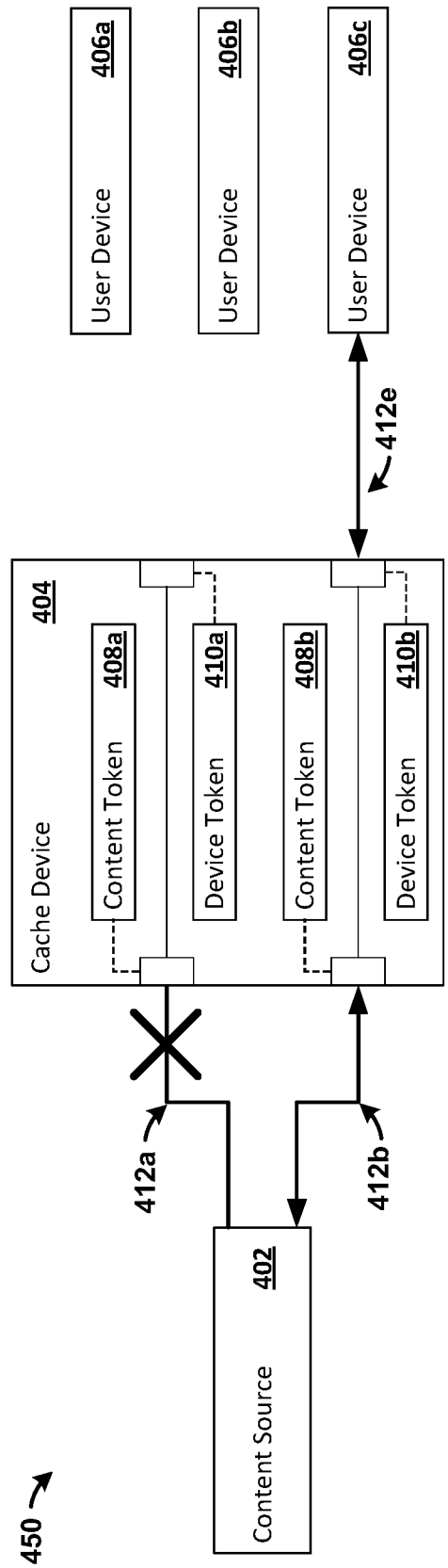
FIG. 4A
FIG. 4B

METHODS AND SYSTEMS FOR SESSION MANAGEMENT

CROSS REFERENCE TO RELATED PATENT APPLICATION

This application is a continuation of and claims priority to U.S. patent application Ser. No. 16/188,233, filed on Nov. 12, 2018, which claims priority to U.S. Provisional Application No. 62/753,612, filed Oct. 31, 2018, the contents of each of which is hereby incorporated herein by reference in their entirety for all purposes.

BACKGROUND

In communication networks, latency in delivering content may cause errors, failed content delivery attempts, and a poor content consumption experience. Communication networks may employ a process in which requests for content are received by intermediate devices that forward the requests to a series of other devices to obtain the content. Computational times required for devices to determine if they are equipped to process a request for content contribute to latency in a communication network and increase the overall content delivery time.

SUMMARY

It is to be understood that both the following general description and the following detailed description are exemplary and explanatory only and are not restrictive. Methods and systems for session management are described. To facilitate the management and delivery of content (e.g., using HTTP Push), it is beneficial to implement logic into the various computing devices of the communication network. Content servers and/or caches may implement logic to facilitate the delivery of content to a user device. By using logic, the content delivery system does not need to use timers to control the push operations in the communication network, while maintaining support for request and response functionality. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems:

FIGS. 4A and 4B show a system for session management for delivery of content;

DETAILED DESCRIPTION

Figure 1:
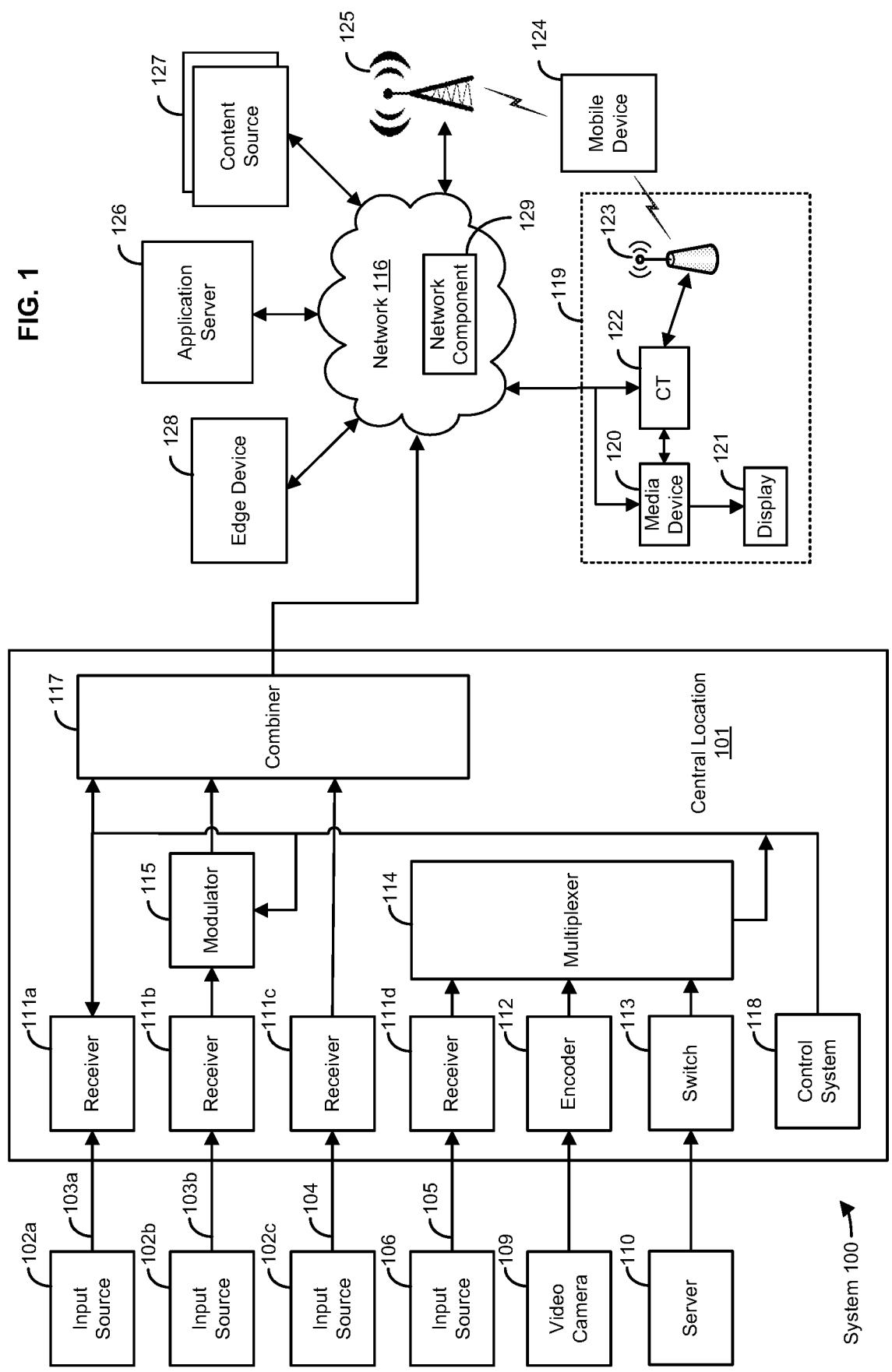
FIG. 1 shows a system for session management for delivery of content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

Phrases used herein, such as "accessing" content, "providing" content, "viewing" content, "listening" to content, "rendering" content, or "playing" content, "consuming" content, and the like are considered interchangeable, related, and/or the same. In some cases, the particular term utilized may be dependent on the context in which it is used. Accessing video may also be referred to as viewing or playing the video. Accessing audio may also be referred to as listening to or playing the audio.

This detailed description may refer to a given entity performing some action. It should be understood that this language may in some cases mean that a system (e.g., a computer) owned and/or controlled by the given entity is actually performing the action.

A content delivery system may use session management for push-type delivery of video. A packaging device may push content to a cache device. The cache device may then facilitate delivering content to the user device. The cache device may have stateful logic that facilitates management of communication connections and content stored on the cache device. The stateful logic eliminates the need to maintain timers to control termination of the Push operations to the caches while maintaining full support for the legacy request and response functionality. Thus, the present description provides an improvement to computing technology in at least that the present description reduces processing overhead by eliminating the need for timers to control termination of Push operations, as well as reducing communications between devices of the content delivery system.

FIG. 1 shows a system 100 for session management for push-type delivery of video. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of sources 102*a*, 102*b*, and 102*c*. The content may be sent from the source to the central location 101 via a variety of transmission paths, including wireless (e.g., satellite paths 103*a*, 103*b*) and terrestrial path 104. The central location 101 may also receive content from a direct feed source 106 via a direct line 105 (e.g., one or more communication sessions, communication sessions, and/or communication paths). Other input sources may be capture devices such as a video camera 109 or a server 110. The content sent by the content sources may comprise a single content item, a portion of a content item (e.g., content fragment), a content stream, a multiplex that includes several content items, and/or the like. The content item may be an advertisement.

The central location 101 may have one or a plurality of receivers 111*a*, 111*b*, 111*c*, 111*d* that are associated with one or more corresponding input sources. The central location 101 may comprise one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

The central location 101 may comprise one or more modulators 115 for interfacing with a distribution system 116. A modulator may receive content from a receiver 111, encoder 112, multiplexer 114, and/or the like. A modulator 115 may convert the received content into a modulated output signal suitable for transmission over the distribution system 116. A modulator 115 may map portions of the content to data bits expressed as signals (e.g., sinusoidal signals) at corresponding subcarrier frequencies of a data symbol. The output signals from the modulators 115 may be combined, using equipment such as a combiner 117, for input into the network 116.

The network 116 may be a content delivery network, a content access network, and/or the like. The network 116 may be configured to send content from a variety of sources using a variety of network paths, protocols, devices, and/or the like. The content delivery network and/or content access network may be managed (e.g., deployed, serviced) by a content provider, a service provider, and/or the like. The network 116 may have a plurality of communication sessions (e.g., communication sessions, communication paths, etc.) connecting a plurality of devices.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a user device (e.g., the media device 120, the communication terminal 122, etc.). The edge device 128 may establish a communication session with the user device. The edge device 128 may track the number of communication sessions and/or user devices communicating with the edge device 128. The edge device 128 may use a token to track the number of communication sessions and/or user devices communicating with the edge device 128. The token may be a counter, a timer, or any token suitable for tracking the number of communication sessions and/or user devices. The edge device 128 may terminate and/or close one or more communication sessions based on a status of the token. The edge device 128 may use session management to terminate and/or close the one or more communication sessions based on the status of the token.

The edge device 128 may determine whether the edge device 128 has access to the requested content. The edge device 128 may determine whether the edge device 128 has access to the requested content after receiving the request for content from the user device. The edge device 128 may determine whether a cache associated with the edge device 128 has the requested content. If the edge device 128 does not have access to the requested content, the edge device 128 may request the requested content from the central location 101, a different edge device 128 and/or the content source 127.

The edge device 128 may establish a communication session with the central location 101, a different edge device 128 and/or the content source 127 to receive the requested content. The edge device 128 may track the content received from the central location 101, a different edge device 128 and/or the content source 127. The edge device 128 may use a token to track the content received from the central location 101, a different edge device 128 and/or the content source 127. The token may be a counter, a timer, or any token suitable for tracking the received content. The edge device 128 may terminate and/or close one or more communication sessions based on a status of the token. The edge device 128 may use session management to terminate and/or close the one or more communication sessions based on the status of the token.

The network 116 may have a network component 129. The network component 129 may be any device, module, and/or the like communicatively coupled to the network 116. The network component 129 may be a router, a switch, a splitter, a packager, a gateway, an encoder, a storage device, a multiplexer, a network access location (e.g., tap), physical session, and/or the like.

Figure 2:
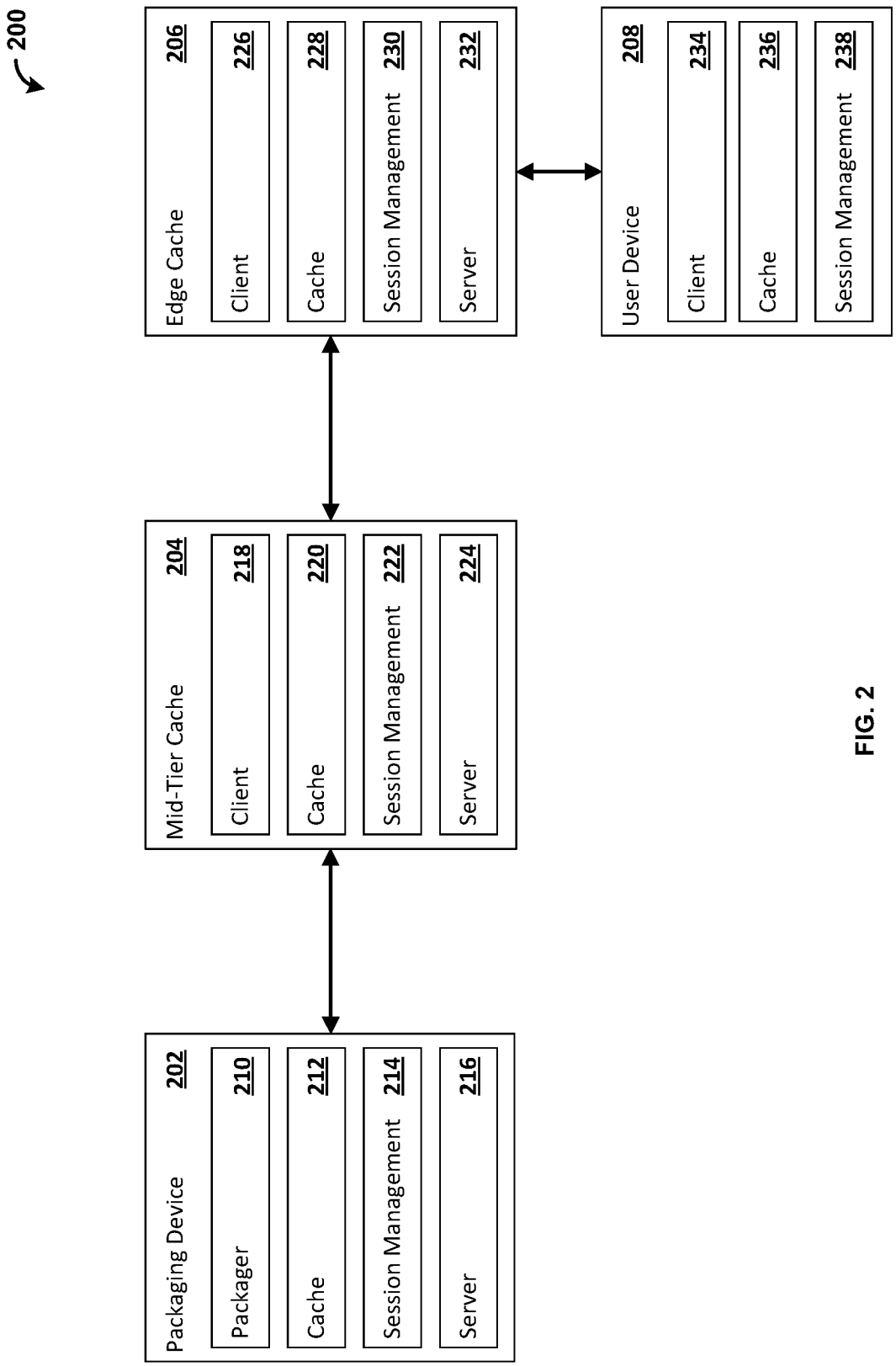
FIG. 2 shows a system for session management for delivery of content.

FIG. 2 shows a system 200. The system 200 may have a packaging device 202 (e.g., the central location 101 and/or the content source 127 of FIG. 1), a mid-tier cache 204 (e.g., the edge device 128 of FIG. 1), an edge cache 206 (e.g., the edge device 128 of FIG. 1), and a user device 208 (e.g., the media device 120, the communication terminal 122, and/or the mobile device 124 of FIG. 1). The system 200 is a content distribution system. While not shown for ease of explanation, a person skilled in the art would appreciate that the system 200 may have any number of packaging devices 202, mid-tier caches 204, edge caches 206, and user devices 208.

As shown, the packaging device 202 may have a packager module 210, a cache 212, a session management module 214, and a server module 216. The modules may be hardware, firmware, software, or a combination therefore. The modules may be associated with a firmware of the packaging device 202. The modules may be maintained (e.g., instantiated, stored, and/or updated) in the firmware of the packaging device 202. While the modules are described for ease of explanation as having certain capabilities, a person skilled in the art would appreciate, that the packaging device 202 includes all the capabilities of the modules.

The packaging device 202 may receive content and package the received content (e.g., using the packager module 210) to send the content to another device (e.g., the mid-tier cache 204). The packaging device 202 may store the received content in the cache 212. The packaging device 202 may also store packaged content ready to be sent to another device in the cache 212. The cache 212 may also remove content. The cache 212 may also remove content after the effective life of the content is ended. The cache 212 may remove data based on a Cache-Control time-to-live protocol.

The server module 216 may be configured to communicate with another device.

The server module 216 may communicate with the mid-tier cache 204, as well as send the mid-tier cache 204 with content. The server module 216 may be configured to handle communications from the packaging device 202 to the mid-tier cache 204. Specifically, the server module 216 may open and/or create a communication session to communicate with the mid-tier cache 204. The server module 216 waits to receive new attempts to establish a communication session for content from a device (e.g., the mid-tier cache 204). When the server module 216 receives a new attempt to establish a communication session, the server module 216 verifies that the requesting device supports a communication protocol that allows the server module 216 to communicate with the requesting device. The server module 216 verifies that the requesting device supports the HTTP 2.0 protocol. The server module 216 creates or updates information associated with the requesting device and/or the communication session. The server module 216 may indicate to the session management module 214 that a new communication session has been established.

The server module 216 may send content to the mid-tier cache tier 204 via the opened/created communication session. The server module 216 may send a plurality of content fragments to the requesting device (e.g., the mid-tier cache 204). The server module 216 may send a plurality of content fragments to the requesting device (e.g., the mid-tier cache 204) after the communication session is established. The server module 216 may push content fragments to the mid-tier cache 204 without the mid-tier cache 204 requesting content. Stated differently, the server module 216 may push content fragments to the mid-tier cache 204 based on the established communication session without the mid-tier cache 204 requesting content because the server module 216 may determine the content the mid-tier cache 204 desires based on the communication session. The server module 216 may push content fragments to the mid-tier cache 204 without the mid-tier cache 204 requesting additional content. Stated differently, after the mid-tier cache 204 requests content from the packaging device 202, the server module 216 will push the content fragments to the mid-tier cache 204 without the mid-tier cache needing to request each of the content fragments. The server module 216 continues to push content fragments to the mid-tier cache 204 until the communication session between the packaging device 202 and the mid-tier cache 204 is closed.

The packaging device 202 may have a session management module 214. The session management module 214 may manage some or all established communication sessions associated with the packaging device 202. The session management module 214 may manage the communication session between the packaging device 202 and the mid-tier cache 204. After the server module 216 establishes a communication session with the mid-tier cache 204, the server module 216 may indicate to the session management module 214 that a communication session has been established so that the session management module 214 may manage the newly established communication session. The session management module 214 may then ensure that the mid-tier cache 204 receives content based on the content requested by the mid-tier cache 214. The session management module 214 may send the requested content, as well as any subsequent content, to the mid-tier cache 204. The session management module 214 pushes content to the mid-tier cache 204 as soon as the content is available for distribution to the mid-tier cache 204. In this manner, the session management module 214 ensures that the mid-tier cache 204 has the most up to date content without mid-tier cache 204 needing to communicate at regular intervals with the packaging device 202. That is, after the communication session is established between the packaging device 202 and the mid-tier cache 204, the session management module 214 will continue to push content to the mid-tier cache 204 until the communication session is closed.

The session management module 214 may be configured to group or associate a plurality of communication sessions for the same content. If there are three mid-tier caches 204 that are requesting the same content, the session management module 214 may treat the three separate communication sessions as associated for efficient management of the communication sessions.

The session management module 214 may have stateful logic for managing the communications sessions associated with the packaging device 202. The session management module 214 may set the state of a communication session as active in order to send content to the requesting device. The session management module 214 may monitor the communication session to ensure the communication session is still active (e.g., that the requesting device is still desiring to receive and/or consume the content). The session management module 214 may continue to push content to the requesting device as long as the communication session is open and/or active. The communication session may be closed and/or deactivated by the packaging device 202 if there is no content to send to the mid-tier cache 204. The communication session may be closed and/or deactivated by the mid-tier cache 204. The communication session may be closed and/or deactivated by the mid-tier cache 204 because the mid-tier cache 204 no longer needs the content associated with the communication session. The session management module 214 may change the stateful logic associated with the communication session to indicate the communication session is closed. The session management module 214 may change the stateful logic associated with the communication session to indicate the communication session is closed after the communication session is closed and/or deactivated. After the session management module 214 may determine the communication session is closed, the session management module 214 may determine whether there are any additional communication sessions requesting the same content associated with the now closed communication session. If there are no other communication sessions requesting the same content, then the session management module 214 may instructed the cache 212 to remove the content as there is no longer a need for the content because no device is requesting the content. In this manner, the session management module 214 clears the cache 212 of any unnecessary data from any closed and/or deactivated communication sessions.

The session management module 214 may use one or more tokens (e.g., counters, timers, etc.) when managing the communication sessions. The session management module 214 may use a content token. The content token may indicate a status of content received and/or sent by the packaging device 202. The session management module 214 may use a device token. The device token may indicate a status of the devices that receive content from the packaging device 202. The session management module 214 may increment a counter associated with each communication session each time a packet is sent via the communication session. The session management module 214 may close and/or deactivate communication sessions after the counter satisfies a threshold. The session management module 214 may close and/or deactivate communication sessions based on the counter satisfying a threshold. Each packet may be 2 seconds in length, and the counter is incremented each time a packet is sent. Thus, if the counter may indicate 30 packets have been sent, the counter may indicate that 60 seconds have passed. The session management module 214 may close and/or deactivate communication sessions after a period of time. If 60 seconds have passed and the session management module 214 does not receive a communication from the requesting device (e.g., the mid-tier cache 204), the session management module 214 may assume the requesting device is no longer consuming the content and closes and/or deactivates the communication session. In this manner, the session management module 214 may use counters to manage the communication sessions associated with the packaging device 202.

The session management module 214 may close and/or deactivate communication sessions without communicating with another device (e.g., the mid-tier cache 204). A counter may be incremented each time a new communication session is added, as well as the counter may be decremented each time a communication session is removed so that the session management module 214 may track the active communication sessions associated with the packaging device 202.

The session management module 214 may keep track of the number of devices associated with a specific type of content. The session management module 214 may use a counter to keep track of the number of devices that have requested the specific content. That is, three devices (e.g., three mid-tier caches 204) may request the specific content. The session management module 214 may maintain the content in the cache 212 until there are no more devices requesting the specific content. A counter may be used to keep track (e.g., count) the number of devices associated with the specific content.

The session management module 214 may use a token (e.g., a counter, a timer, etc.) to ensure a communication session is active. A counter may be incremented each time the packaging device 202 packages data for transmission. The counter may be decremented when the packaging device 202 may send data to a device (e.g., the mid-tier cache 204). If the counter satisfies a threshold (e.g., reaches 30 counts), the session management module 214 may determine that the communication session with the mid-tier cache 204 is closed since data is not being sent to the mid-tier cache 204 because the counter has not been decremented to indicate data has been sent. In turn, the session management module 214 may close the communication session with the mid-tier cache 204 as well as decrement the counter associated with the communication sessions managed by the session management module 214. The session management module 214 may determine that the communication session with the mid-tier cache 204 is closed because the mid-tier cache 204 closes a socket associated with the communication session so that the packing device 202 may no longer send data via the communication session. In this manner, the session management module 214 is able to close and/or maintain communications sessions with other devices without the need for the devices to communicate back and forth by using a counter.

As shown, the mid-tier cache 204 may have a client module 218, a cache 220, a session management module 222, and a server module 224. The modules may be hardware, firmware, software, or a combination therefore. The modules may be associated with a firmware of the mid-tier cache 204. The modules may be maintained (e.g., instantiated, stored, and/or updated) in the firmware of the mid-tier cache 204. While the modules are described for ease of explanation as having certain capabilities, a person skilled in the art would appreciate, that the mid-tier cache 204 includes all the capabilities of the modules.

The mid-tier cache 204 may receive content and store the received content in the cache 220. The server 224 may communicate with another device. The server 224 may communicate with the packaging device 202 and/or the edge cache device 206. The mid-tier cache 204 receives pushed content from the packaging device 202. The mid-tier cache 204 may also send content to the edge cache 206. The mid-tier cache 204 pushes content to the edge cache 206 as the content becomes available. That is, when the mid-tier cache 204 receives pushed content from the packaging device 202, the mid-tier cache 204 pushes the content to the edge cache 206.

The cache 220 may store content. The cache 220 may store content received from the packaging device 202, as well as content for distributing to the edge cache 206. The cache 220 may also update content stored within the cache 220 based on the received content. The cache 220 may remove content. The cache 220 may remove content after the effective life of the content is ended. The cache 220 may remove data based on a Cache-Control time-to-live protocol.

The client module 218 may communicate with another device. The client module 218 may communicate with the packaging device 202. The client module 218 may establish a communication session with the packaging device 202 in order to receive content from the packaging device 202. The client module 218 may request content that is not in the cache 220. The mid-tier cache 204 may receive a request for content (e.g., from the edge cache 206), and may determine that the cache 220 does not have the requested content. Thus, the client module 218 establishes the communication session with the packaging device 202 to request the missing content. The client module 218 may push the content to the requesting device (e.g., the edge cache 206). The client module 218 may push the content to the requesting device (e.g., the edge cache 206) after the mid-tier cache 204 receives the missing content.

The server module 224 may be configured to communicate with another device.

The server module 224 may communicate with the edge cache 206, as well as send the edge cache 206 content. The server module 224 may be configured to handle communications for the mid-tier cache 204 to the edge cache 206. Specifically, the server module 224 may open and/or create a communication session to communicate with the edge cache 206. The server module 224 waits to receive new attempts to establish a communication session for content from a device (e.g., the edge cache 206). When the server module 224 receives a new attempt to establish a communication session, the server module 224 verifies that the requesting device supports a communication protocol that allows the server module 224 to communicate with the requesting device. The server module 224 verifies that the requesting device supports the HTTP 2.0 protocol. The server module 224 creates or updates information associated with the requesting device and/or the communication session. The server module 224 may indicate to the session management module 222 that a new communication session has been established.

The server module 224 may send content to the edge cache 206 via the opened/created communication session. The server module 224 may send a plurality of content fragments to the requesting device (e.g., the edge cache 206). The server module 224 may send a plurality of content fragments to the requesting device (e.g., the edge cache 206) after the communication session is established. The server module 224 may push content fragments to the edge cache 206 without the edge cache 206 requesting content. Stated differently, the server module 224 may push content fragments to the edge cache 206 based on the established communication session without the edge cache 206 requesting content because the server module 224 may determine the content the edge cache 206 desires based on the communication session. The server module 224 may push content fragments to the edge cache 206 without the edge cache 206 sending additional requests for content. Stated differently, after the edge cache 206 requests content from the mid-tier cache 204, the server module 224 will push the content fragments to the edge cache 206 without the edge cache 206 needing to request each of the content fragments. The server module 224 continues to push content fragments to the edge cache 206 until the communication session between the mid-tier cache 204 and the edge cache 206 is closed.

The mid-tier cache 204 may have a session management module 222. The session management module 222 manages all established communication sessions associated with the mid-tier cache 204. The session management module 214 manages the communication sessions between the mid-tier cache 204 and the packaging device 202, as well as the communication sessions between the mid-tier cache 204 and the edge cache 206.

The server module 224 may indicate to the session management module 222 that a communication session has been established so that the session management module 222 may manage the newly established communication session. The server module 224 may indicate to the session management module 222 that a communication session has been established so that the session management module 222 may manage the newly established communication session after the server module 224 establishes a communication session with the edge cache 206. The session management module 222 may then ensure that the edge cache 206 receives content based on the content requested by the edge cache 206. The session management module 222 may send the requested content, as well as any subsequent content, to the edge cache 206. The session management module 222 pushes content to the edge cache 206 as soon as the content is available for distribution to the edge cache 206.

The client module 218 may indicate to the session management module 222 that a communication session has been established so that the session management module 222 may manage the newly established communication session. The client module 218 may indicate to the session management module 222 that a communication session has been established so that the session management module 222 may manage the newly established communication session after the client module 218 establishes a communication session with the packaging device 202. The session management module 222 may then ensure that the mid-tier cache 204 receives the content requested from the packing device 202. In this manner, the session management module 222 ensures that the mid-tier cache 204, as well as the edge cache 206, have the most up to date content from the packaging device 202. That is, after the communication session is established between the packaging device 202 and the mid-tier cache 204, the session management module 222 may push the content received from the packaging device 202 to the edge cache 206 until the communication session is closed between the mid-tier cache 204 and the edge cache 206, or until the communication session is closed between the mid-tier cache 204 and the packaging device 202.

The session management module 222 may be configured to group or associate a plurality of communication sessions for the same content. If there are three edge caches 206 that are requesting the same content, the session management module 222 may treat the three separate communication sessions as associated for efficient management of the communication sessions.

The session management module 222 may have stateful logic for managing the communications sessions associated with the mid-tier cache 204. The session management module 222 may set the state of a communication session as active in order to send content to a device requesting content (e.g., the edge cache 206). The session management module 222 may monitor the communication session to ensure the communication session is still active (e.g., that the requesting device is still desiring to receive and/or consume the content). The session management module 222 may continue to push content to the requesting device as long as the communication session is open and/or active. The communication session may be closed and/or deactivated by the mid-tier cache 204 if there is no content to send to the edge cache 206. The communication session may be closed and/or deactivated by the edge cache 206 because the edge cache 206 no longer needs the content associated with the communication session.

The session management module 222 may modify the stateful logic based on a state of the communication session. The session management module 222 may change the stateful logic associated with the communication session to indicate the communication session is closed after the communication session is closed and/or deactivated. After the edge cache 206 closes the communication session with the mid-tier cache 204, the session management module 222 may close a communication session with the packaging device 202. Stated differently, when all communication sessions to downstream devices (e.g., the edge cache 206) are closed, the mid-tier cache 204 may close a communication session with the packaging device 202 because the mid-tier cache 204 no longer needs the content from the packaging device 202 since the edge cache 206 is no longer requesting the content. The mid-tier cache 204 may request content from the packaging device 202 to send to the edge cache 206. Thus, a communication session may be established between the packaging device 202 and the mid-tier cache 204 in order to send content to the edge cache 206. However, after the edge cache 206 may indicate that the edge cache 206 no longer needs the content (e.g., closes and/or deactivates the communication session between the edge cache 206 and the mid-tier cache 204), the session management module 222 closes the communication session between the packaging device 202 and the mid-tier cache 204 because the content associated with the aforementioned communication session is no longer needed. In this manner, the session management module 222 may manage multiple associated communication sessions. The mid-tier cache 204 may close the communication session with the edge cache 206 and/or the packaging device 202 in response to, and/or based on, the user device 208 closing the communication session with the mid-tier cache 204.

The session management module 222 may determine whether there are any additional communication sessions requesting the same content associated with the now closed communication session. The session management module 222 may determine whether there are any additional communication sessions requesting the same content associated with the now closed communication session after the session management module 222 may determine the communication session is closed. If there are no other communication sessions (e.g., active communication sessions) requesting the same content, then the session management module 222 may instruct the cache 220 to remove the content as there is no longer a need for the content because no device is requesting the content. In this manner, the session management module 222 clears the cache 220 of any unnecessary data from any closed and/or deactivated communication sessions.

The session management module 222 may use one or more tokens (e.g., counters, timers, etc.) when managing the communication sessions. The session management module 222 may use a content token. The content token may indicate a status of content received and/or sent by the mid-tier cache 204. The session management module 222 may use a device token. The device token may indicate a status of the devices that receive content from the mid-tier cache 204. The session management module 222 may increment a counter associated with each communication session each time a packet is sent via the communication session. The session management module 222 may close and/or deactivate communication sessions after the counter satisfies a threshold. The session management module 222 may close and/or deactivate communication sessions based on the counter satisfying a threshold. Each packet may be 2 seconds in length, and the counter is incremented each time a packet is sent. Thus, if the counter may indicate 30 packets have been sent, the counter may indicate that 60 seconds have passed. The session management module 222 may close and/or deactivate communication sessions after a period of time. If 60 seconds have passed and the session management module 222 does not receive a communication from the requesting device (e.g., the edge cache 206), the session management module 222 may assume the requesting device is no longer consuming the content and closes and/or deactivates the communication session. In this manner, the session management module 222 may use counters to manage the communication sessions associated with the mid-tier cache 204.

The session management module 222 may close and/or deactivate communication sessions without communicating with another device (e.g., the packaging device 202, the edge cache 206, etc.). A counter may be incremented each time a new communication session is added, as well as the counter may be decremented each time a communication session is removed so that the session management module 222 may track the active communication sessions associated with the mid-tier cache 204.

The session management module 222 may keep track of the number of devices associated with a specific type of content. The session management module 222 may use a counter to keep track of the number of user devices that have requested the specific content. That is, three user devices (e.g., edge caches 206) may request the specific content from the mid-tier cache 204. Each of the three edge caches 206 may have a communication session associated with each of the edge caches 206. A counter may be used to keep track of (e.g., count) the number of user devices (e.g., edge caches 206) associated with the specific content. The counter may keep track of (e.g., count) the number of communication sessions associated with the specific content. When a user device (e.g., one of the edge caches 206) closes a communication session, the counter may be updated to reflect the removal of a user device. The counter may be decremented until the counter satisfies a threshold (e.g., the counter reaches zero to indicate there are no active communication sessions or user devices associated with the specific content). The counter may be incremented if additional user devices request content from the mid-tier cache 204.

When the counter satisfies the threshold (e.g., the counter reaches zero to indicate there are no active communication sessions or user devices associated with the specific content), the session management module 222 may close a communication session to a device that the mid-tier cache 204 is receiving content from. The session management module 222 may close a communication session associated with the packaging device 202 that sent the content to the mid-tier cache 204 for distribution to the user devices (e.g., the three edge caches 206). The session management module 222 may close a communication session associated with the packaging device 202 based on the counter satisfying a threshold (e.g., the counter reaches zero). That is, when there are no longer any user devices associated with a specific content, the session management module 222 may close a communication session to a device that is supplying the specific content to the mid-tier cache 204 because the mid-tier cache 204 no longer needs the specific content. In this manner, the session management module 222 may close communication sessions with an upstream device (e.g., the packaging device 202) based on the mid-tier cache 204 having no user devices (e.g., the edge cache 206) that are requesting the content that the upstream device was sending to the mid-tier cache 204. Similarly, the session management module 222 may close communication sessions with downstream devices (e.g., the edge cache 206), if the communication session with the upstream device (e.g., the packaging device 202) is terminated or rendered inactive. In this manner, the session management module 222 allows the mid-tier cache 204 to dynamically control communication sessions associated with the mid-tier cache 204.

The session management module 222 may use a token (e.g., a counter, a timer, etc.) to ensure a communication session is active. A counter may be incremented each time the mid-tier cache 204 receives data (e.g., from the packaging device 202). The counter may be decremented when the mid-tier cache 204 may send data to a device (e.g., the edge cache 206). If the counter satisfies a threshold (e.g., reaches 30 counts), the session management module 222 may determine that the communication session with the edge cache 206 is closed since data is not being sent to the edge cache 206 because the counter has not been decremented to indicate data has been sent. In turn, the session management module 222 may close the communication session with the edge cache 206 as well as decrement the counter associated with the communication sessions managed by the session management module 222. The session management module 222 may determine that the communication session with the edge cache 206 is closed because the edge cache 206 closes a socket associated with the communication session so that the mid-tier cache 204 may no longer send data via the communication session. In this manner, the session management 222 is able to close and/or maintain communications sessions with other devices without the need for the devices to communicate back and forth by using a counter.

As shown, the edge cache 206 may have a client module 226, a cache 228, a session management module 230, and a server module 232. The modules may be hardware, firmware, software, or a combination therefore. The modules may be associated with a firmware of the edge cache 206. The modules may be maintained (e.g., instantiated, stored, and/or updated) in the firmware of the edge cache 206. While the modules are described for ease of explanation as having certain capabilities, a person skilled in the art would appreciate, that the edge cache 206 includes all the capabilities of the modules.

The edge cache 206 may receive content and store the received content in the cache 228. The cache 228 may store content. The cache 228 may store content received from the mid-tier cache 204, as well as content for distributing to the user device 208. The cache 228 may also update content stored within the cache 228 based on the received content. The cache 228 may also remove content after the effective life of the content is ended. The cache 228 may remove data based on a Cache-Control time-to-live protocol.

The client module 226 may communicate with another device. The client module 226 communicates with the mid-tier cache 204. The client module 226 establishes a communication session with the mid-tier cache 204 in order to receive content from the mid-tier cache 204. The client module 226 may request content that is not in the cache 228. The edge cache 206 may receive a request for content (e.g., from the user device 208), and may determine that the cache 228 does not have the requested content. Thus, the client module 226 establishes the communication session with the mid-tier cache 204 to request the missing content. The client module 226 may push the content to the requesting device (e.g., the user device 208). The client module 226 may push the content to the requesting device (e.g., the user device 208) after the edge cache 206 receives the missing content.

The server module 232 may be configured to communicate with another device.

The server module 232 may communicate with the user device 208, as well as provide the user device 208 with content. The server module 232 may be configured to handle communications for the edge cache 206 to the user device 208. Specifically, the server module 232 may open and/or create a communication session to communicate with the user device 208. The server module 232 waits to receive new attempts to establish a communication session for content from a device (e.g., the user device 208). When the server module 232 receives a new attempt to establish a communication session, the server module 232 verifies that the requesting device supports a communication protocol that allows the server module 232 to communicate with the requesting device. The server module 232 verifies that the requesting device supports the HTTP 2.0 protocol. The server module 232 creates or updates information associated with the requesting device and/or the communication session. The server module 232 may indicate to the session management module 230 that a new communication session has been established.

The server module 232 may send content to user device 208 via the opened/created communication session. The server module 232 may send a plurality of content fragments to the requesting device (e.g., the user device 208). The server module 232 may send a plurality of content fragments to the requesting device (e.g., the user device 208) after the communication session is established. The server module 232 may push content fragments to the user device 208 without the user device 208 requesting content. Stated differently, the server module 232 may push content fragments to the user device 208 based on the established communication session without the user device 208 requesting content because the server module 232 may determine the content the user device 208 desires based on the communication session. The server module 232 may push content fragments to the user device 208 without the user device 208 sending additional requests for content. Stated differently, after the user device requests content from the edge cache 206, the server module 232 will push the content fragments to the user device 208 without the user device 208 needing to request each of the content fragments. The server module 232 continues to push content fragments to the user device 208 until the communication session between the edge cache 206 and the user device 208 is closed.

The edge cache 206 may have a session management module 230. The session management module 230 manages all established communication sessions associated with the edge cache 206. The session management module 230 manages the communication sessions between the edge cache 206 and the mid-tier cache 204, as well as the communication sessions between the edge cache 206 and the user device 208.

The server module 232 may indicate to the session management module 230 that a communication session has been established so that the session management module 230 may manage the newly established communication session. The server module 232 may indicate to the session management module 230 that a communication session has been established so that the session management module 230 may manage the newly established communication session after the server module 230 establishes a communication session with the user device 208. The session management module 230 may then ensure that the user device 208 receives content based on the content requested by the user device 208. The session management module 230 may send the requested content, as well as any subsequent content, to the user device 208. The session management module 230 pushes content to the user device 208 as soon as the content is available for distribution to the user device 208.

The client module 226 may indicate to the session management module 230 that a communication session has been established so that the session management module 230 may manage the newly established communication session. The client module 226 may indicate to the session management module 230 that a communication session has been established so that the session management module 230 may manage the newly established communication session after the client module 226 establishes a communication session with the mid-tier cache 204. The session management module 230 may then ensure that the edge cache 206 receives the content requested from the mid-tier cache 204. In this manner, the session management module 230 ensures that the edge cache 206, as well as the user device 208, have the most up to date content from the mid-tier cache 204. That is, after the communication session is established between the edge cache 206 and the mid-tier cache 204, the session management module 230 may push the content received from the mid-tier cache to the user device 208 until the communication session is closed between the edge cache 206 and the user device 208, or until the communication session is closed between the edge cache 206 and the mid-tier cache 204.

The session management module 230 may be configured to group or associate a plurality of communication sessions for the same content. If there are three user device 208 that are requesting the same content, the session management module 230 may treat the three separate communication sessions as associated for efficient management of the communication sessions.

The session management module 230 may have stateful logic for managing the communications sessions associated with the edge cache 206. The session management module 230 may set the state of a communication session as active in order to provide content to a device requesting content (e.g., the user device 208). The session management module 230 may monitor the communication session to ensure the communication session is still active (e.g., that the requesting device is still desiring to receive and/or consume the content). The session management module 230 may continue to push content to the requesting device as long as the communication session is open and/or active. The communication session may be closed and/or deactivated by the edge cache 206 if there is no content to send to the user device 208. The communication session may be closed and/or deactivated by the user device 208 because the user device 208 no longer needs the content associated with the communication session.

The session management module 230 may modify the stateful logic. The session management module 230 may modify the stateful logic after the communication session is closed and/or deactivated. The session management module 230 may modify the stateful logic associated with the communication session to indicate the communication session is closed. The session management module 230 may close a communication session with the mid-tier cache 204. The session management module 230 may close a communication session with the mid-tier cache 204 after the user device 208 closes the communication session with the edge cache 206. Stated differently, when all communication sessions to downstream devices (e.g., the user device 208) are closed, the edge cache 206 may close a communication session with the mid-tier cache 204 because the edge cache 206 no longer needs the content from the mid-tier cache 204. The edge cache 206 may request content from the mid-tier cache 204 to send to the user device 208. Thus, a communication session may be established between the edge cache 206 and the mid-tier cache 204 in order to send content to the user device 208. However, after the user device 208 may indicate that the user device 208 no longer needs the content (e.g., closes and/or deactivates the communication session between the user device 208 and the edge cache 206), the session management module 230 closes the communication session between the edge cache 206 and the mid-tier cache 204 because the content associated with the aforementioned communication session is no longer needed. The edge cache 206 may close the communication session with the mid-tier cache 204 in response to, and/or based on, the user device 208 closing the communication session with the edge cache 206. In this manner, the session management module 230 may manage multiple associated communication sessions.

The session management module 230 may determine whether there are any additional communication sessions requesting the same content associated with the now closed communication session. The session management module 230 may determine whether there are any additional communication sessions requesting the same content associated with the now closed communication session after the session management module 230 may determine the communication session is closed. If there are no other communication sessions requesting the same content, then the session management module 230 may instruct the cache 228 to remove the content as there is no longer a need for the content because no device is requesting the content. In this manner, the session management module 230 clears the cache 228 of any unnecessary data from any closed and/or deactivated communication sessions.

The session management module 230 may use one or more tokens (e.g., counters, timers, etc.) when managing the communication sessions. The session management module 230 may use a content token. The content token may indicate a status of content received and/or sent by the edge cache 206. The session management module 230 may use a device token. The device token may indicate a status of the devices that receive content from the edge cache 206. The session management module 230 may increment a counter associated with each communication session each time a packet is sent via the communication session. The session management module 230 may close and/or deactivate communication sessions after the counter satisfies a threshold. The session management module 230 may close and/or deactivate communication sessions based on the counter satisfying a threshold. Each packet may be 2 seconds in length, and the counter is incremented each time a packet is sent. Thus, if the counter may indicate 30 packets have been sent, the counter may indicate that 60 seconds have passed. The session management module 230 may close and/or deactivate communication sessions after a period of time. If 60 seconds have passed and the session management module 230 does not receive a communication from the requesting device (e.g., the user device 208), the session management module 230 may assume the requesting device is no longer consuming the content and closes and/or deactivates the communication session. In this manner, the session management module 230 may use counters to manage the communication sessions associated with the edge cache 206.

The session management module 230 may use one or more tokens (e.g., counters, timers, etc.) when managing the communication sessions. The session management module 230 may increment a counter associated with each communication session each time a packet is sent via the communication session. Each packet may be 2 seconds in length, and the counter is incremented each time a packet is sent. Thus, if the counter may indicate 30 packets have been sent, the counter may indicate that 60 seconds have passed. The session management module 230 may close and/or deactivate communication sessions after a period of time. If 60 seconds have passed, and the session management module 230 does not receive a communication from the requesting device (e.g., the user device 208), the session management module 230 may assume that the requesting device is no longer consuming the content and closes and/or deactivates the communication session. In this manner, the session management module 230 may use counters to manage the communication sessions associated with the edge cache 206.

The session management module 230 may close and/or deactivate communication sessions without communicating with another device (e.g., the mid-tier cache 204, the user device 208, etc.). A counter may be incremented each time a new communication session is added, as well as the counter may be decremented each time a communication session is removed so that the session management module 230 may track the active communication sessions associated with the edge cache 206.

The session management module 230 may keep track of the number of devices associated with a specific type of content. The session management module 230 may use a counter to keep track of the number of user devices that have requested the specific content. That is, three user devices (e.g., user devices 208) may request the specific content from the edge cache 206. Each of the three user devices 208 may have a communication session associated with each of the user devices 208. A counter may be used to keep track of (e.g., count) the number of user devices (e.g., user device 208) associated with the specific content. The counter may keep track of (e.g., count) the number of communication sessions associated with the specific content. When a user device (e.g., one of the user devices 208) closes a communication session, the counter may be updated to reflect the removal of a user device. The counter may be decremented until the counter satisfies a threshold (e.g., the counter reaches zero to indicate there are no active communication sessions or user devices associated with the specific content). The counter may be incremented if additional user devices request content from the edge cache 206.

When the counter satisfies the threshold (e.g., the counter reaches zero to indicate there are no active communication sessions or user devices associated with the specific content), the session management module 230 may close a communication session to a device that the mid-tier cache 204 is receiving content from. The session management module 230 may close a communication session associated with the packaging device 202 that sent the content to the mid-tier cache 204 for distribution to the user devices (e.g., the three edge caches 206). The session management module 230 may close a communication session associated with the packaging device 202 based on the counter satisfying a threshold (e.g., the counter reaches zero). That is, when there are no longer any user devices associated with a specific content, the session management module 230 may close a communication session to a device that is supplying the specific content to the mid-tier cache 204 because the mid-tier cache 204 no longer needs the specific content. In this manner, the session management module 230 may close communication sessions with an upstream device (e.g., the packaging device 202) based on the mid-tier cache 204 having no user devices (e.g., the edge cache 206) that are requesting the content that the upstream device was sending to the mid-tier cache 204. Similarly, the session management module 230 may close communication sessions with downstream devices (e.g., the user device 208), if the communication session with the upstream device (e.g., the mid-tier cache 204) is terminated or rendered inactive. In this manner, the session management module 230 allows the edge cache 206 to dynamically control communication sessions associated with the edger cache 206.

The session management module 230 may use a token (e.g., a counter, a timer, etc.) to ensure a communication session is active. A counter may be incremented each time the edge cache 206 receives data (e.g., from the mid-tier cache 204). The counter may be decremented when the edge cache 206 may send data to a device (e.g., the user device 208). If the counter satisfies a threshold (e.g., reaches 30 counts), the session management module 230 may determine that the communication session with the user device 208 is closed since data is not being sent to the user device 208 because the counter has not been decremented to indicate data has been sent. In turn, the session management module 230 may close the communication session with the user device 208 as well as decrement the counter associated with the communication sessions managed by the session management module 230. The session management module 230 may determine that the communication session with the user device 208 is closed because the user device 208 closes a socket associated with the communication session so that the edge cache 206 may no longer send data via the communication session. In this manner, the session management 230 is able to close and/or maintain communications sessions with other devices without the need for the devices to communicate back and forth by using a counter.

As shown, the user device 208 may have a client module 234, a cache 236, and a session management module 238. The cache 236 may store content. The modules may be hardware, firmware, software, or a combination therefore. The modules may be associated with a firmware of the user device 208. The modules may be maintained (e.g., instantiated, stored, and/or updated) in the firmware of the user device 208. While the modules are described for ease of explanation as having certain capabilities, a person skilled in the art would appreciate, that the user device 208 includes all the capabilities of the modules.

The cache 236 may store content received from the edge cache 206. The cache 236 may also update content stored within the cache 236 based on the received content. The cache 236 may also remove content after the effective life of the content is ended. The cache 236 may remove data based on a Cache-Control time-to-live protocol.

The client module 234 may communicate with another device. The client module 234 communicates with the edge cache 206. The client module 234 establishes a communication session with the edge cache 206 in order to receive content from the edge cache 206. The client module 234 may request content that is not in the cache 236. The user device 208 may receive a request for content (e.g., from a user of the user device), and may determine that the cache 236 does not have the requested content. Thus, the client module 234 establishes the communication session with the edge cache 206 to request the missing content. The edge cache 206 may in turn create a communication session with the mid-tier cache 204. The edge cache 206 may in turn create a communication session with the mid-tier cache 204 after requesting the content from the edge cache 206. Thus, the user device 208 requesting content may result in the edge cache 206 requesting content to fulfill the request. Stated differently, a downstream device (e.g., the user device 208) may cause an upstream device (e.g., the edge cache 206, the mid-tier cache 204, and/or the packaging device 202) to create one or more communication sessions to facilitate completion of the request. The client module 234 may display the content (e.g., on a display device). The client module 234 may display the content (e.g., on a display device) after the user device 208 receives the missing content.

The user device 208 may have a session management module 238. The session management module 238 manages all established communication sessions associated with the user device 208. The session management module 238 manages the communication sessions between the user device 208 and the edge cache 206. The session management module 238 manage the communication sessions between the user device 208 and a plurality of edge caches 206.

The client module 234 may indicate to the session management module 238 that a communication session has been established so that the session management module 238 may manage the newly established communication session. The client module 234 may indicate to the session management module 238 that a communication session has been established so that the session management module 238 may manage the newly established communication session after the client module 234 establishes a communication session with the edge cache 206. The session management module 238 may then ensure that the user device 208 receives the content requested from the edge cache 206. In this manner, the session management module 238 ensures that the user device 208 has the most up to date content from the edge cache 206. That is, after the communication session is established between the edge cache 206 and the user device 208, the session management module 238 may ensure the requested content is received from the edge cache 206 until the communication session is closed between the edge cache 206 and the user device 208.

The session management module 238 may have stateful logic for managing the communications sessions associated with the user device 208. The session management module 238 may set the state of a communication session as active in order to receive content. The session management module 238 may monitor the communication session to ensure the communication session is still active. The communication session may be closed and/or deactivated by the user device 208 because the user device 208 no longer needs the content associated with the communication session. A user of the user device 208 may indicate to the user device 208 that the user no longer wishes to consume the content. Thus, the user device 208 closes and/or deactivates the communication session between the user device 208 and the edge cache 206.

The session management module 238 may instruct the cache 236 to remove the content. The session management module 238 may instruct the cache 236 to remove the content. The session management module 238 may instruct the cache 236 to remove the content as there is no longer a need for the content after the session management module 238 may determine the communication session is closed. In this manner, the session management module 238 clears the cache 236 of any unnecessary data from any closed and/or deactivated communication sessions.

The user device 208 may not have the session management 238. The user device 208 may not support HTTP 2.0, which may allow the device 208 to use the session management 238. Rather, the user device 208 may use a legacy protocol. When the user device has a legacy protocol, the session management 238 is bypassed and a request/response model is used for the user device 208. In this manner, the system 200 may be configured to communicate with devices that have a legacy protocol, as well as devices that implement session management.

While FIG. 2 is described with only one packaging device 202, one mid-tier cache 204, one edge cache 206, and one user device 208 for ease of explanation, a person skilled in the art would appreciate there could a plurality of each of the devices. Also, while a single communication session is shown between each of the packaging device 202, the mid-tier cache 204, the edge cache 206, and the user device 208 for ease of explanation, a person skilled in the art would appreciate there may be multiple communication sessions between the devices, such as a communication session for a manifest, another communication session for video content, a third communication session for audio content, and so forth. Further, while FIG. 2 shows each device (e.g., the packaging device 202, the mid-tier cache 204, the edge cache 206, and the user device 208) as having a session management module for ease of explanation, a person skilled in the art would appreciate that the devices do not have to have a session management module, and it is contemplated that all, some, and/or none of the devices of FIG. 2 have to have a session management module.

Figure 3:
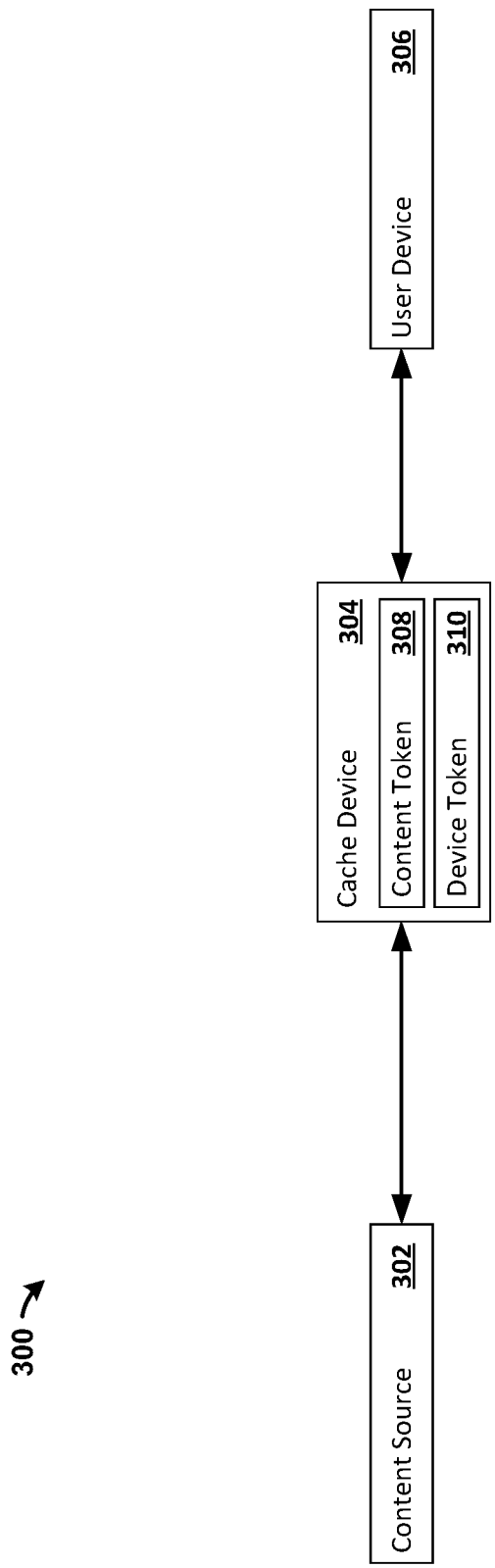
FIG. 3 shows a system for session management for delivery of content.

FIG. 3 shows a system 300. The system 300 may have a content source 302 (e.g., the central location 101 and/or the content source 127 of FIG. 1; the packaging device 202 and/or the mid-tier cache 204 of FIG. 2), a cache device 304 (e.g., the edge device 128 of FIG. 1; the mid-tier cache 204 and/or the edge cache 206 of FIG. 2), and a user device 306 (e.g., the media device 120, the communication terminal 122, and/or the mobile device 124 of FIG. 1; the mid-tier cache 204, the edge cache 206, and/or the user device 206 of FIG. 2). The content source 302 may send content to the cache device 304 via a communication session. The cache device 304 may send the received content to the user device 306.

The content may be received and/or sent in packets. The cache device 304 may monitor the received content (e.g., the received packets) and/or the sent content (e.g., the sent packets) using a content token 308. That is, the content token 308 may indicate a status associated with the content. The content token 308 may be a counter, a timer, or other token for indicating the received content. The content token 308 may be updated (e.g., incremented, decremented, reset, etc.). The content token 308 may increment and/or decrement based on the received content. The content token 308 may increment and/or decrement based on each packet of the received content. The content token 308 may increment and/or decrement based on the sent content. The content token 308 may increment and/or decrement based on each packet of the sent content. The content token 308 may be reset (e.g., to a default value) based on the received and/or sent content. The content token 308 may be decremented and/or reset based on the packets received by the cache device 304 (e.g., from the content source 302), and the content token 308 may be incremented based on the packets sent by the cache device 304 (e.g., to the user device 306).

The content token 308 may have a state associated with the content token 308. The state of the content token 308 may indicate the current state of the content token 308 (e.g., a value of a counter, a current time of a timer, etc.). The state of the content token 308 may be updated (e.g., incremented, decremented, reset, etc.) to reflect changes associated with the content token 308.

The cache device 304 may take an action based on the content token 308 satisfying a threshold. The cache device 304 may terminate the communication session (e.g., close a socket associated with the communication session) with the user device 306 based on the content token 308 satisfying the threshold. The threshold may be a value associated with a counter (e.g., 1, 15, 30, 100, etc.), a time period associated with a timer (e.g., 1 ms, 5 ms, 1 second, 1 minute, etc.), or any threshold that may be associated with the content token 308. The threshold may indicate a problem (e.g., a failure, termination of, etc.) of the communication session with the content source 302. The cache device 304 may terminate the communication session with the user device 306 based on the content token 308 satisfying the threshold because the content token 308 may indicate that the cache device 304 may no longer be receiving content from the content source 302. Thus, the cache device 304 may manage communication sessions between the content source 302 and the user device 306 by utilizing the content token 308.

The cache device 304 may have a device token 310. The device token 310 may be a counter, a timer, or other token for indicating devices associated with the cache device 304. The device token 310 may indicate user devices (e.g., the user device 306) receiving content from the cache device 304. The device token 310 may increment and/or decrement based on a user device (e.g., the user device 306) establishing or terminating a communication session with the cache device 304. The user device 306 may request content from the cache device 304, and a communication session may be established between the cache device 304 and the user device 306. The device token 310 may be incremented to indicate an increase in the number of devices receiving content from the cache device 304. The user device 306 may terminate (e.g., close a socket associated with) the communication session with the cache device 304. The device token 310 may be decremented to indicate a decrease in the number of devices receiving content from the cache device 304.

The device token 310 may have a state associated with the device token 310. The state of the device token 310 may indicate the current state of the device token 310 (e.g., a value of a counter, a current time of a timer, etc.). The state of the device token 310 may be updated (e.g., incremented, decremented, reset, etc.) to reflect changes associated with the device token 310.

The cache device 304 may take an action based on the device token 310 satisfying a threshold. The cache device 304 may terminate the communication session (e.g., close a socket associated with the communication session) with the content source 302 based on the device token 310 satisfying the threshold. The threshold may be a value associated with a counter (e.g., 1, 15, 30, 100, etc.), a time period associated with a timer (e.g., 1 ms, 5 ms, 1 second, 1 minute, etc.), or any threshold that may be associated with the device token 310. The threshold may indicate that the cache device 304 no longer needs content from the content source 302. The device token 310 may be decremented based on the user device 306 terminating the communication session, and the device token 310 may satisfy a threshold that may indicate that there are no user devices 306 receiving content from the cache device 304. The cache device 304 may terminate (e.g., close a socket associated with) the communication session with the content source 302 because the cache device 304 no longer needs content from the content source 304 since there are no user devices 306 receiving content form the cache device 304. Thus, the cache device 304 may manage communication sessions between the content source 302 and the user device 306 by utilizing the device token 310.

While a single content source 302, a single cache device 304, and a single user device 306 are used for ease of explanation, a person skilled in the art would appreciate that the system 300 may have any number of content sources 302, cache devices 304, and user devices 306.

FIG. 4A shows a system 400. The system 400 may have a content source 402 (e.g., the central location 101 and/or the content source 127 of FIG. 1; the packaging device 202 and/or the mid-tier cache 204 of FIG. 2; and/or the content source 302 of FIG. 3), a cache device 404 (e.g., the edge device 128 of FIG. 1; the mid-tier cache 204 and/or the edge cache 206 of FIG. 2; and/or the cache device 304 of FIG. 3), and user devices 406a, 406b, and 406c (e.g., the media device 120, the communication terminal 122, and/or the mobile device 124 of FIG. 1; the mid-tier cache 204, the edge cache 206, and/or the user device 206 of FIG. 2; and/or the user device 306 of FIG. 3). The content source 402 may send content to the cache device 404 via one or more communication sessions (e.g., the communication sessions 412a and 412b. The cache device 404 may receive the content, and send the received content to the user devices 406a, 406b, and 406c via one or more communication sessions (e.g., the communication sessions 412c, 412c, and 412d).

The user devices 406a, 406b, and 406c may request content from the cache device 404. The user devices 406a and 406b may request a first content, and the user device 406c may request a second content. The first content and the second content may be the same, or different, content. The cache device 404 may request content from the content source 402 based on the requests from the user devices 406a, 406b, and 406c. The cache 404 may request the first content and the second content from the content source 402.

The content source 402 may send the requested content to the cache device 404. The content source 402 may send the requested content on two separate communication sessions (e.g., the communication sessions 412a, 412b). The content source 402 may send the first content on the communication session 412a, and the content source 402 may send the second content on the communication session 412b. The cache device 404 may receive the content items from the content source 402 via the communication sessions 412a and 412b, and send the content items to the user devices 406a, 406b, and 406c via the communication sessions 412c, 412d, and 412e. The cache device 404 may send the first content to the user devices 406a and 406b via the communication sessions 412c and 412d, and may send the second content to the user device 406c via the communication session 412e.

The cache device 404 may have content tokens 408a and 408b. The content tokens 408a and 408b may be associated with specific content, as well as specific communication sessions. The content token 408a may be associated with the first content. The content token 408a may be associated with the communication sessions 412a (e.g., the communication session 412 that the cache device 404 receives the first content) and the communication sessions 412c and 412d (e.g., the communication sessions 412 that that the cache device may send the first content). The content token 408a may increment when a packet of content (e.g., a packet of the first content from the content source 402 via the communication session 412a) is sent to a user device 406 (e.g., the user devices 406a, 406b via the communication sessions 412c, 412d). The content token 408a may decrement and/or reset to a default value (e.g., 0) when a packet is received from the content source 402.

The content token 408b may be associated with the second content. The content token 408b may be associated with the communication sessions 412b (e.g., the communication session 412 that the cache device 404 receives the second content) and the communication session 412e (e.g., the communication session 412 that that the cache device may send the second content). The content token 408b may increment when a packet of content (e.g., a packet of the second content from the content source 402 via the communication session 412b) is sent to a user device 406 (e.g., the user device 406c via the communication session 412e). The content token 408b may decrement and/or reset to a default value (e.g., 0) when a packet is received from the content source 402.

The cache device 404 may have device tokens 410a and 410b. The device tokens 410a and 410b may be a counter, a timer, or other token for indicating devices associated with the cache device 304. The device tokens 410a and 410b may indicate user devices (e.g., the user devices 406a, 406b, 406c) receiving content from the cache device 404. The device tokens 410a and 410b may increment and/or decrement based on a user device 406 establishing or terminating a communication session with the cache device 404. The device tokens 410a and 410b may be associated with specific content and/or specific communication sessions. The device tokens 410a and 410b may indicate the user devices 406 associated with the specific content and/or the specific communication sessions. The device token 410a, similar to the content token 408a, may be associated with the first content and the user devices 406a and 406b. The device token 410a may indicate that there are two user devices (e.g., the user devices 406a and 406b) receiving the first content from the cache device 404. The device token 410b, similar to the content token 408b, may be associated with the second content and the user device 406c. The device token 410b may indicate that there is one user device (e.g., the user device 406c) receiving the second content from the cache device 404.

FIG. 4B shows a system 450. The system 450 may have a content source 402 (e.g., the central location 101 and/or the content source 127 of FIG. 1; the packaging device 202 and/or the mid-tier cache 204 of FIG. 2; and/or the content source 302 of FIG. 3), a cache device 404 (e.g., the edge device 128 of FIG. 1; the mid-tier cache 204 and/or the edge cache 206 of FIG. 2; and/or the cache device 304 of FIG. 3), and user devices 406a, 406b, and 406c (e.g., the media device 120, the communication terminal 122, and/or the mobile device 124 of FIG. 1; the mid-tier cache 204, the edge cache 206, and/or the user device 206 of FIG. 2; and/or the user device 306 of FIG. 3). The system 450 is similar to the system 400 of FIG. 4A, but the communication sessions 412c and 412d associated the user devices 406a and 406b, respectively, are terminated and/or closed.

The cache device 404 may take an action based on the device tokens 410a and/or 410b satisfying a threshold. The cache device 404 may terminate a communication session (e.g., close a socket associated with the communication session) with the content source 402 based on the device tokens 410*a* and/or 410*b* satisfying the threshold. The threshold may indicate that the cache device 404 no longer needs content from the content source 404.

The user devices 406*a* and 406*b* may terminate and/or close the communication sessions 412*c* and 412*d*. Thus, the user devices 406*a* and 406*b* are no longer receiving content from the cache device 404. The device token 410*a* may be decremented to indicate that the cache device 404 is no longer sending content to the user devices 406*a* and 406*b*. The device token 410*a* may satisfy a threshold after decrementing to indicate that the cache device 404 is no longer sending content to the user devices 406*a* and 406*b*. The cache device 404, based on the device token 410*a* satisfying the threshold, may terminate and/or close the communication session associated with the content being sent to the user devices 406*a* and 406*b* (e.g., close and/or terminate the communication session 412*a*) because the cache device 404 no longer needs the content associated with the communication session 412*a* as there are no user devices requesting the content associated with the communication session 412*a* as indicated by the device token 410*a*. However, the cache device 404 may allow the communication sessions 412*b* and 412*e* to remain active and/or open because the device token 410*b* may indicate there is a user device (e.g., the user device 406*c*) still requesting content. Thus, the cache device 404 may determine which communication sessions 412 are terminated and/or closed based on the device tokens 410*a* and 410*b*.

Figure 5:
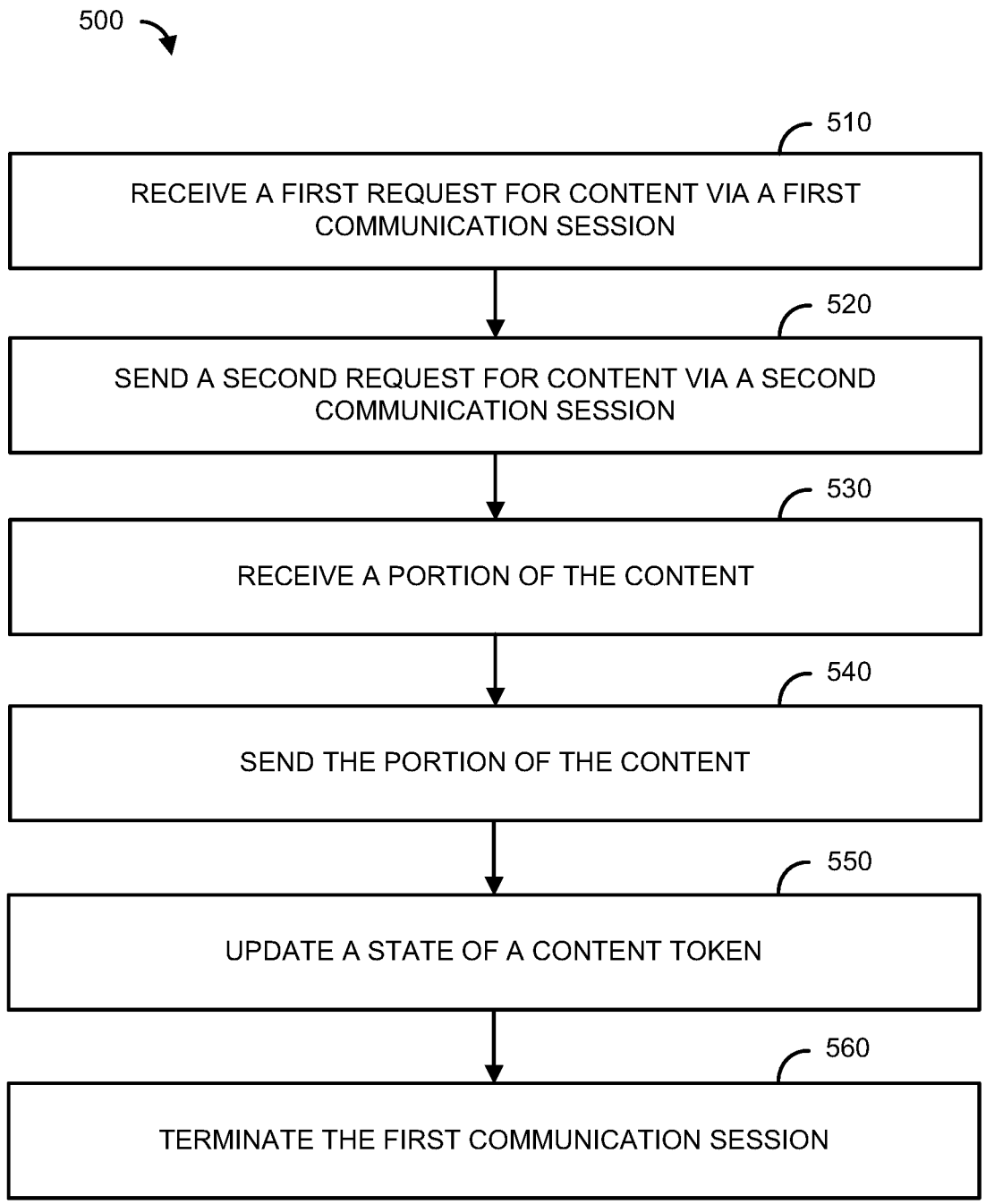
FIG. 5 shows a flowchart of a method for session management for delivery of content.

FIG. 5 is a flowchart of a method 500 for implementing session management for delivery of content. At step 510, a first request for content may be received (e.g., by a computing device). The first request for content may be received via a first communication session. The first request for content may be received from a user device. The content may be an advertisement. The packaging device 202, the mid-tier cache 204, and/or the edge cache 206 may receive the request for content. The packaging device 202 may receive the request for content from at least one of the mid-tier cache 204, the edge cache 206, and/or the user device 208. The mid-tier cache 204 may receive the request for content from the edge cache 206 and/or the user device 208. The edge cache may receive the request from the user device 208.

At step 520, a second request for the content may be sent (e.g., by the computing device). The second request for the content may be sent via a second communication session. The packaging device 202, the mid-tier cache 204, and/or the edge cache 206 may determine that the packaging device 202, the mid-tier cache 204, and/or the edge cache 206 do not have access to the requested content. Thus, the packaging device 202, the mid-tier cache 204, and/or the edge cache 206 may request the content from another device. The packaging device 202 may request the content from a content provider. The mid-tier cache 204 may request the content from the packaging device 202. The edge cache 206 may request the content from the mid-tier cache 204.

At step 530, a portion of the content may be received (e.g., by the computing device). The portion of the content may be received from a computing device upstream from the computing device. The portion of the content may be one or more packets. The content may be received based on sending the second request for content. The content may be received via the second communication session. The packaging device 202, the mid-tier cache 204, and/or the edge cache 206 may receive the content. The packaging device 202 may receive the content from a content provider. The mid-tier cache 204 may receive the content from the packaging device 202. The edge cache 206 may receive the content from the mid-tier cache 204.

At step 540, the portion of the content may be sent (e.g., by the computing device). The portion of the content may be sent to a computing device downstream. The portion of the content may be the received portion of the content. The portion of the content may be one or more packets. The portion of the content (e.g., one or more packets) may be sent to a user device (e.g., the mid-tier cache 204, the edge cache 206, and/or the user device 208). The portion of the content may be sent to the user device based on a push protocol. That is, the received one or more packets may be pushed to the user device without the user device needing to request each individual packet. The packaging device 202, the mid-tier cache 204, and/or the edge cache 206 may send the content. The content may be sent via a communication session (e.g., the first communication session). The packaging device 202 may send the content to the mid-tier cache 204. The mid-tier cache 204 may send the content to the edge cache 206. The edge cache 206 may send the content to the user device 208.

At step 550, the state of the content token may be updated (e.g., by the computing device). The state of the content token may be updated (e.g., by the session management 214, 222, 230, 238) based on the portion of content. The token may be maintained in the firmware of the computing device. The state of the content token may be updated based on receiving and/or sending the portion of the content. The content token may be a counter, and the state of the content token may be a number associated with the counter. The counter may be incremented or decremented based on the sent and/or received portion of the content. The counter may be incremented based on sending the portion of the content. The counter may be decremented based on receiving the content. The counter may be reset (e.g., set to a default value such as zero) based on the sent and/or received one or more packets of the content.

At step 560, the communication session may be terminated (e.g., by the computing device). The second communication session may be terminated. The communication session may be terminated based on the state of the content token satisfying the threshold. The threshold may indicate that there are no computing devices upstream from the computing device that are sending content to the computing device. The content token may be a counter, and the threshold may be a number that may indicate the second communication session is inactive. The counter may be incremented each time a packet is sent via the first communication session, and the counter is reset when a packet is received via the second communication session. If a certain number of packets are sent (e.g., the number of packets sent satisfies the threshold) without receiving a packet to reset the counter, the communication session may be terminated. The threshold may be any suitable number (e.g., 5, 20, 100, etc.). The packaging device 202, the mid-tier cache 204, the edge cache 206, and/or the user device 208 may terminate the communication session.

While the method 500 is described with requesting and receiving content (e.g., at steps 510, 520, and 530) for ease of explanation, a person skilled in the art would appreciate that the method 500 does not require that content be requested and received. That is, the steps 510, 520, and 530 may be optional steps.

Figure 6:
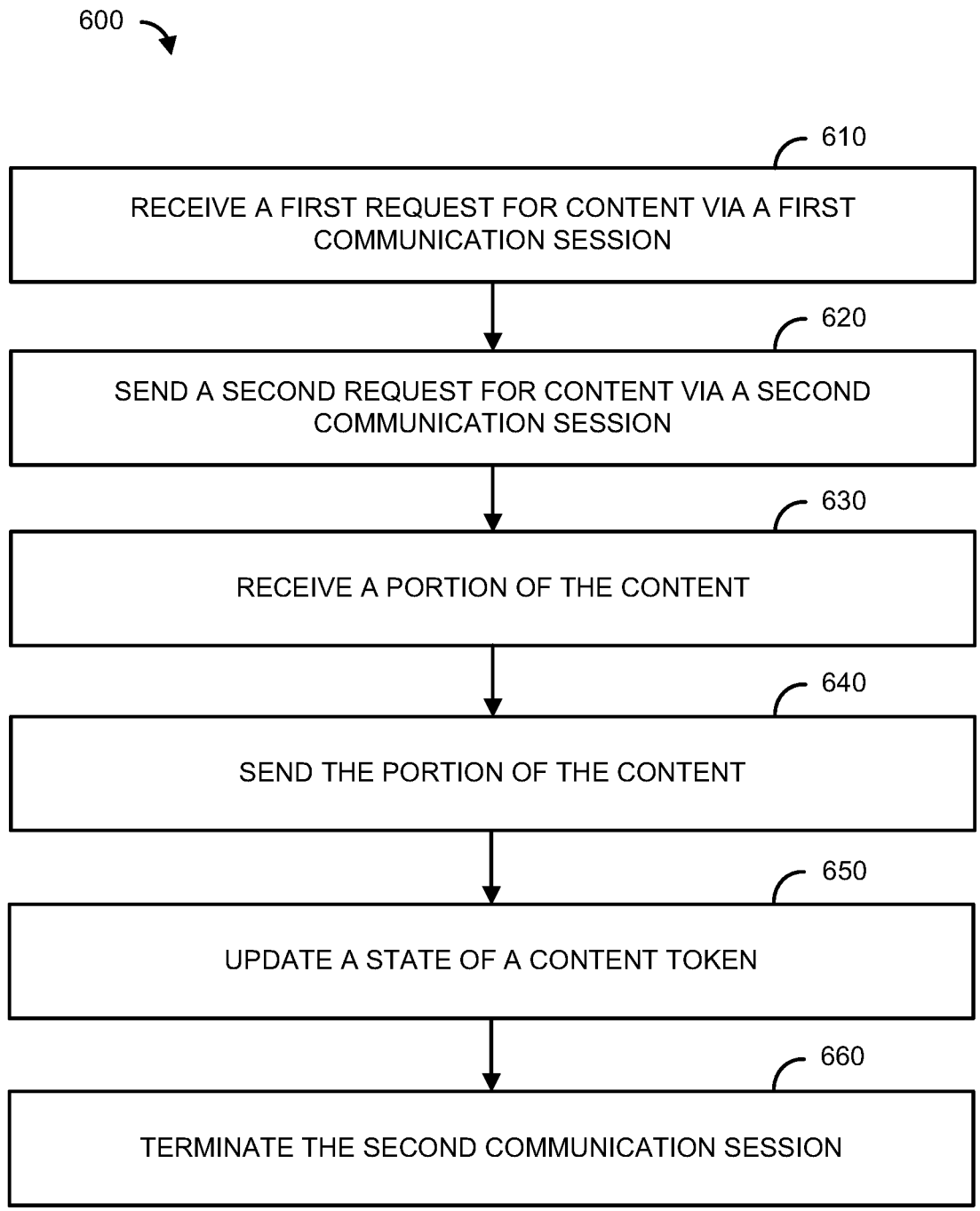
FIG. 6 shows a flowchart of a method for session management for delivery of content.

FIG. 6 is a flowchart of a method 600 for implementing session management for delivery of content. At step 610, a first request for content may be received (e.g., by a computing device). The first request for content may be received via a first communication session. The first request for content may be received from a user device. The content may be an advertisement. The packaging device 202, the mid-tier cache 204, and/or the edge cache 206 may receive the request for content. The packaging device 202 may receive the request for content from at least one of the mid-tier cache 204, the edge cache 206, and/or the user device 208. The mid-tier cache 204 may receive the request for content from the edge cache 206 and/or the user device 208. The edge cache may receive the request from the user device 208.

At step 620, a second request for the content may be sent (e.g., by the computing device). The second request for the content may be sent via a second communication session. The packaging device 202, the mid-tier cache 204, and/or the edge cache 206 may determine that the packaging device 202, the mid-tier cache 204, and/or the edge cache 206 do not have access to the requested content. Thus, the packaging device 202, the mid-tier cache 204, and/or the edge cache 206 may request the content from another device. The packaging device 202 may request the content from a content provider. The mid-tier cache 204 may request the content from the packaging device 202. The edge cache 206 may request the content from the mid-tier cache 204.

At step 630, a portion of the content may be received (e.g., by the computing device). The portion of the content may be received from a computing device upstream from the computing device. The portion of the content may be one or more packets. The content may be received based on sending the second request for content. The content may be received via the second communication session. The packaging device 202, the mid-tier cache 204, and/or the edge cache 206 may receive the content. The packaging device 202 may receive the content from a content provider. The mid-tier cache 204 may receive the content from the packaging device 202. The edge cache 206 may receive the content from the mid-tier cache 204.

At step 640, the portion of the content may be sent (e.g., by the computing device). The portion of the content may be sent to a computing device downstream. The portion of the content may be the received portion of the content. The portion of the content may be one or more packets. The portion of the content (e.g., one or more packets) may be sent to a user device (e.g., the mid-tier cache 204, the edge cache 206, and/or the user device 208). The portion of the content may be sent to the user device based on a push protocol. That is, the received one or more packets may be pushed to the user device without the user device needing to request each individual packet. The packaging device 202, the mid-tier cache 204, and/or the edge cache 206 may send the content. The content may be sent via a communication session (e.g., the first communication session). The packaging device 202 may send the content to the mid-tier cache 204. The mid-tier cache 204 may send the content to the edge cache 206. The edge cache 206 may send the content to the user device 208.

At step 650, the state of the content token may be updated (e.g., by the computing device). The state of the content token may be updated (e.g., by the session management 214, 222, 230, 238) based on the portion of content. The token may be maintained in the firmware of the computing device. The state of the content token may be updated based on receiving and/or sending the portion of the content. The content token may be a counter, and the state of the content token may be a number associated with the counter. The counter may be incremented or decremented based on the sent and/or received portion of the content. The counter may be incremented based on sending the portion of the content. The counter may be decremented based on receiving the content. The counter may be reset (e.g., set to a default value such as zero) based on the sent and/or received one or more packets of the content.

At step 660, the communication session may be terminated (e.g., by the computing device). The second communication session may be terminated. The communication session may be terminated based on the state of the content token satisfying the threshold. The threshold may indicate that there are no computing devices downstream from the computing device that are receiving content from the computing device. The content token may be a counter, and the threshold may be a number that may indicate the first communication session is inactive. The packaging device 202, the mid-tier cache 204, the edge cache 206, and/or the user device 208 may terminate the communication session.

While the method 600 is described with requesting and receiving content (e.g., at steps 610, 620, and 630) for ease of explanation, a person skilled in the art would appreciate that the method 600 does not require that content be requested and received. That is, the steps 610, 620, and 630 may be optional steps.

Figure 7:
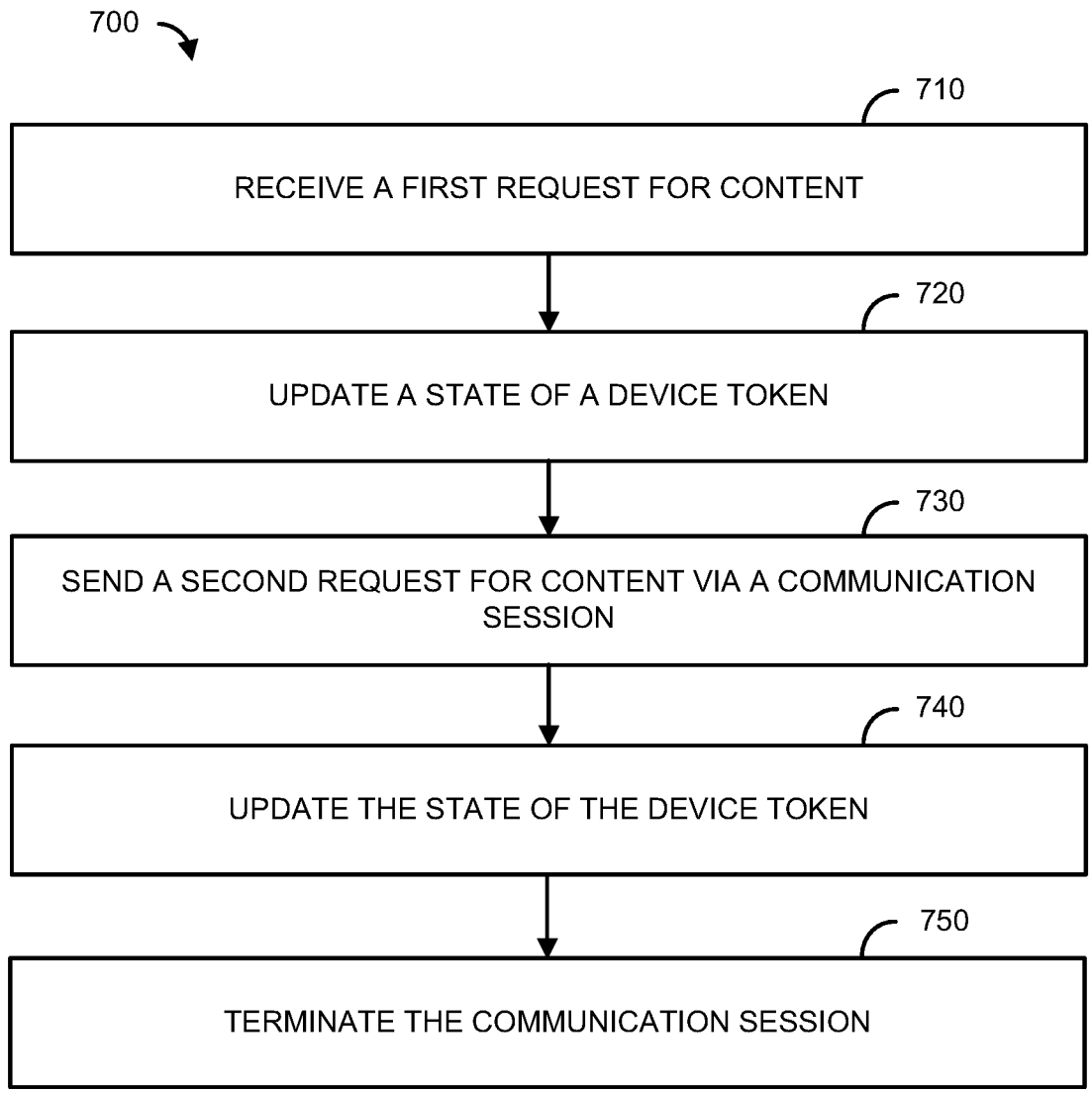
FIG. 7 shows a flowchart of a method for session management for delivery of content.

FIG. 7 is a flowchart of a method 700 for implementing session management for delivery of content. At step 710, a first request for content may be received (e.g., by a computing device). The first request for content may be received via a first communication session. The first request for content may be received from a user device. The content may be an advertisement. The packaging device 202, the mid-tier cache 204, and/or the edge cache 206 may receive the request for content. The packaging device 202 may receive the request for content from at least one of the mid-tier cache 204, the edge cache 206, and/or the user device 208. The mid-tier cache 204 may receive the request for content from the edge cache 206 and/or the user device 208. The edge cache may receive the request from the user device 208.

At step 720, a state of a device token may be updated (e.g., by the computing device). The device token may be updated (e.g., by the session management 214, 222, 230, 238) based on the received request for content. The device token may indicate the number of devices or communication sessions associated with the computing device. The token may be maintained in the firmware of the computing device. The device token may be a counter, and the state of the device token may be a number associated with the counter. The counter may be incremented or decremented based on a number of devices or communication sessions associated with the computing device receiving the request. The counter may be incremented based on receiving the request for content or based on a new communication session being established with the device requesting the content.

At step 730, a second request for the content may be sent (e.g., by the computing device). The second request for the content may be sent via a second communication session. The packaging device 202, the mid-tier cache 204, and/or the edge cache 206 may determine that the packaging device 202, the mid-tier cache 204, and/or the edge cache 206 do not have access to the requested content. Thus, the packaging device 202, the mid-tier cache 204, and/or the edge cache 206 may request the content from another device. The packaging device 202 may request the content from a content provider. The mid-tier cache 204 may request the content from the packaging device 202. The edge cache 206 may request the content from the mid-tier cache 204.

At step 740, the state of the device token may be updated (e.g., by the computing device). The device token may be updated (e.g., by the session management 214, 222, 230, 238) based on determining the first communication session is inactive. The device token may be a counter, and the state of the device token may be a number associated with the counter. The counter may be incremented or decremented based on a number of devices or communication sessions associated with the computing device receiving the request. The counter may be incremented when a new device establishes a communication session. The counter may be decremented based on determining that a user device has closed or inactivated a communication session.

At step 750, the communication session may be terminated (e.g., by the computing device). The second communication session may be terminated. The communication session may be terminated based on the state of the device token satisfying the threshold. Satisfying the threshold may indicate that there are no devices downstream from the computing device that are receiving content. The device token may be a counter, and the threshold may be a number that indicates that there are no user devices that are requesting content. The counter may be decremented each time a device closes or inactivates a communication session. The threshold may be any suitable number (e.g., 0, 1, 5, 20, 100, etc.). Thus, when the threshold is satisfied, there is no requested content needed via the second communication session. The packaging device 202, the mid-tier cache 204, the edge cache 206, and/or the user device 208 may terminate the communication session.

While the method 700 is described with requesting and receiving content (e.g., at steps 710, 720, and 730) for ease of explanation, a person skilled in the art would appreciate that the method 700 does not require that content be requested and received. That is, the steps 710, 720, and 730 may be optional steps.

Figure 8:
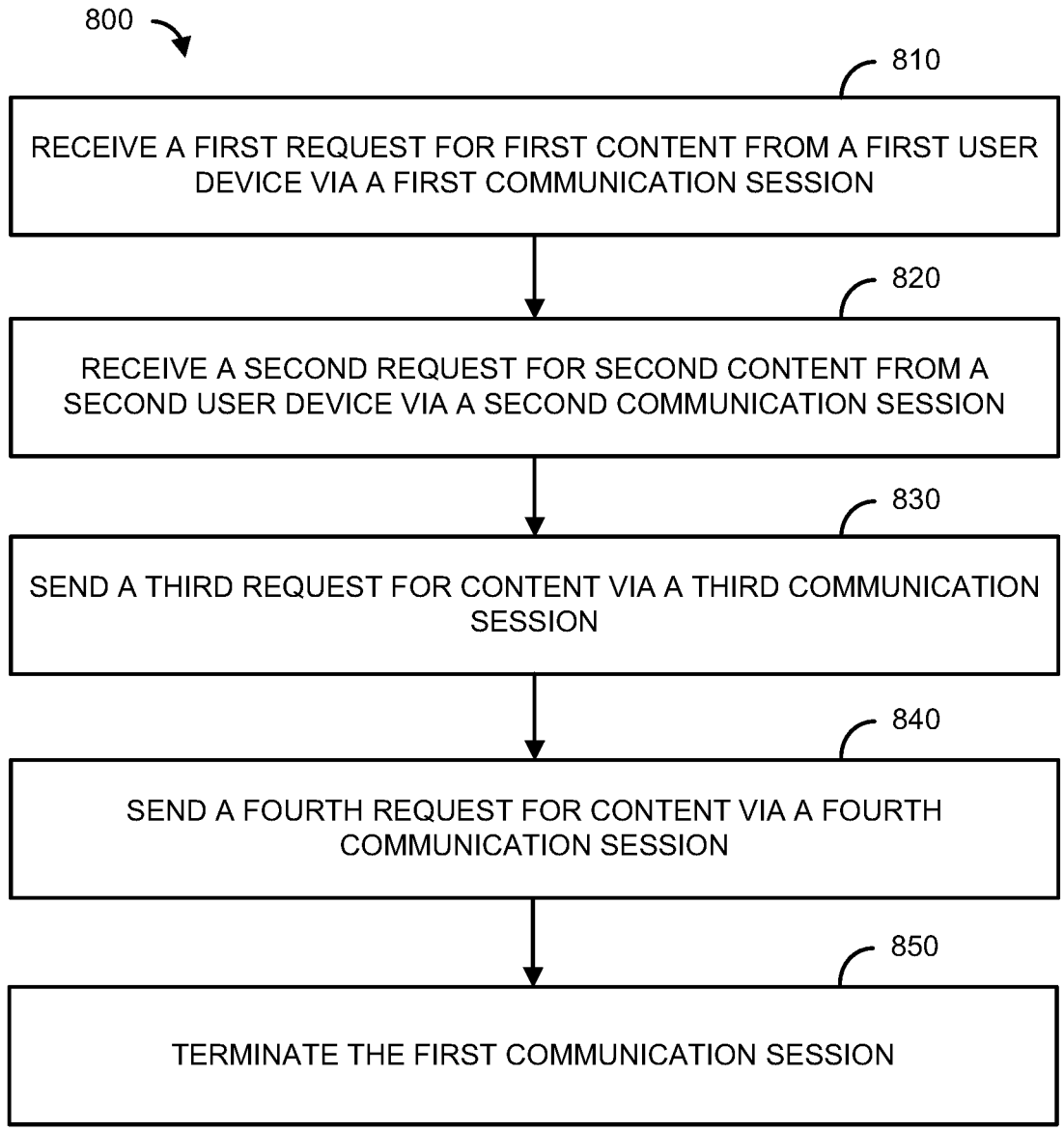
FIG. 8 shows a flowchart of a method for session management for delivery of content.

FIG. 8 is a flowchart of a method 800 for implementing session management for delivery of video. At step 810, a first request for first content may be received. The first request for first content may be received via a first communication session. The first request for first content may be received from a user device. The content may be an advertisement. The packaging device 202, the mid-tier cache 204, and/or the edge cache 206 may receive the request for content. The packaging device 202 may receive the request for content from at least one of the mid-tier cache 204, the edge cache 206, and/or the user device 208. The mid-tier cache 204 may receive the request for content from the edge cache 206 and/or the user device 208. The edge cache may receive the request from the user device 208.

At step 820, a second request for second content may be received. The second request for second content may be received via a second communication session. The second request for second content may be received from a user device. The content may be an advertisement. The packaging device 202, the mid-tier cache 204, and/or the edge cache 206 may receive the request for content. The packaging device 202 may receive the request for content from at least one of the mid-tier cache 204, the edge cache 206, and/or the user device 208. The mid-tier cache 204 may receive the request for content from the edge cache 206 and/or the user device 208. The edge cache may receive the request from the user device 208.

At step 830, a third request for the content may be sent. The third request may be for the first content or the second content. The third request may be sent via a third communication session. The packaging device 202, the mid-tier cache 204, and/or the edge cache 206 may determine that the packaging device 202, the mid-tier cache 204, and/or the edge cache 206 do not have access to the requested content. Thus, the packaging device 202, the mid-tier cache 204, and/or the edge cache 206 may request the content from another device. The packaging device 202 may request the content from a content provider. The mid-tier cache 204 may request the content from the packaging device 202. The edge cache 206 may request the content from the mid-tier cache 204.

At step 840, a fourth request for the content may be sent. The fourth request may be for the first content or the second content. The fourth request may be sent via a fourth communication session. The packaging device 202, the mid-tier cache 204, and/or the edge cache 206 may determine that the packaging device 202, the mid-tier cache 204, and/or the edge cache 206 do not have access to the requested content. Thus, the packaging device 202, the mid-tier cache 204, and/or the edge cache 206 may request the content from another device. The packaging device 202 may request the content from a content provider. The mid-tier cache 204 may request the content from the packaging device 202. The edge cache 206 may request the content from the mid-tier cache 204.

At step 850, the first communication session may be terminated. The first communication session may be terminated based on the state of a content token satisfying a threshold. The content token may be a counter, and the threshold may be a number that may indicate the third communication session is inactive. The counter may be incremented each time a packet is sent via the first communication session, and the counter is reset when a packet is received via the third communication session. If a certain number of packets are sent (e.g., the number of packets sent satisfies the threshold) without receiving a packet to reset the counter, the first communication session may be terminated. The threshold may be any suitable number (e.g., 5, 20, 100, etc.). The packaging device 202, the mid-tier cache 204, the edge cache 206, and/or the user device 208 may terminate the communication session.

Figure 9:
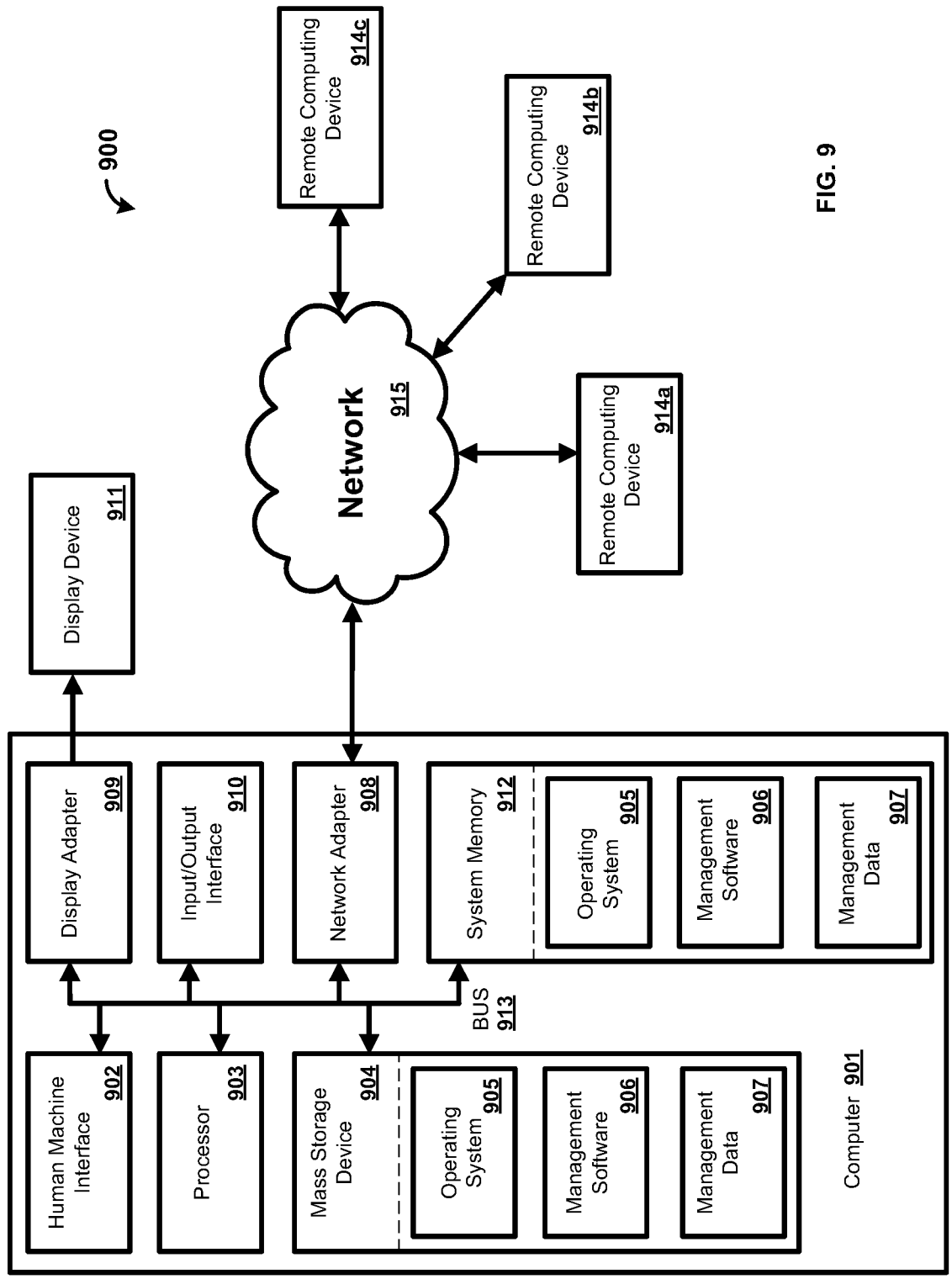
FIG. 9 shows a block diagram of a computing device for implementing session management for delivery of content.

FIG. 9 shows a system 900 for implementing session management for delivery of video. The server 110, the application server 126, the content source 127, or the edge device 128 of FIG. 1 may be a computer 901 as shown in FIG. 9. The media device 120 and/or the mobile device 124 of FIG. 1 may be a computer 901 as shown in FIG. 9. The packager 202, the mid-tier cache 204, the edge cache 206, and the user device 208 of FIG. 2 may be a computer 901 as shown in FIG. 9. The content source 302, the cache device 304, and the user device 306 of FIG. 3 may be a computer 901 as shown in FIG. 9. The content source 402, the cache device 404, and the user devices 406 of FIGS. 4A and 4B may be a computer 901 as shown in FIG. 9.

The computer 901 may comprise one or more processors 903, a system memory 912, and a bus 913 that couples various system components including the one or more processors 903 to the system memory 912. In the case of multiple processors 903, the computer 901 may utilize parallel computing.

The bus 913 is one or more of several possible types of bus structures, including a memory bus or memory controller, a peripheral bus, an accelerated graphics port, or local bus using any of a variety of bus architectures.

The computer 901 may operate on and/or comprise a variety of computer readable media (e.g., non-transitory).

The readable media may be any available media that is accessible by the computer 901 and may include both volatile and non-volatile media, removable and non-removable media. The system memory 912 has computer readable media in the form of volatile memory, such as random access memory (RAM), and/or non-volatile memory, such as read only memory (ROM). The system memory 912 may store data such as the management data 907 and/or program modules such as the operating system 905 and the management software 906 that are accessible to and/or are operated on by the one or more processors 903.

The computer 901 may also have other removable/non-removable, volatile/non-volatile computer storage media. FIG. 9 shows the mass storage device 904 which may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 904, such as the operating system 905 and the management software 906. Each of the operating system 905 and the management software 906 (or some combination thereof) may have elements of the program modules and the management software 906. The management data 907 may also be stored on the mass storage device 904. The management data 907 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 915.

A user may enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

The display device 911 may also be connected to the bus 913 via an interface, such as the display adapter 909. It is contemplated that the computer 901 may have more than one display adapter 909 and the computer 901 may have more than one display device 911. The display device 911 may be a monitor, an LCD (Liquid Crystal Display), light emitting diode (LED) display, television, smart lens, smart glass, and/or a projector. In addition to the display device 911, other output peripheral devices may be components such as speakers (not shown) and a printer (not shown) which may be connected to the computer 901 via the Input/Output Interface 910. Any step and/or result of the methods may be output (or caused to be output) in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 901 and a remote computing device 914a,b,c may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the one or more processors 903 of the computer. An implementation of the management software 906 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
    receiving, by a first computing device from a second computing device via a first communication session, at least one packet of content, wherein a state of a content token is caused to be modified based on receiving at least one of the at least one packet of the content;
    sending, to a third computing device via a second communication session, at least one packet of the at least one received packet of the content, wherein the state of the content token is caused to be modified based on at least one of the at least one sent packet of the content; and based on the state of the content token satisfying a threshold, terminating the first communication session.

2. The method of claim 1, wherein the content token comprises a counter,
wherein causing the state of the content token to be modified based on receiving the at least one of the at least one packet of the content comprises incrementing the counter, and
wherein causing the state of the content token to be modified based on the at least one of the at least one sent packet of the content comprises decrementing the counter.

3. The method of claim 1, further comprising:
based on the second communication session becoming at least one of active or inactive, causing a modification to a state of a device token, wherein the state of the device token indicates a status of the second communication session; and
based on the state of the device token satisfying a second threshold, terminating the first communication session.

4. The method of claim 1, wherein the content token comprises a counter,
wherein causing the state of the content token to be modified based on receiving the at least one of the at least one packet of the content comprises resetting the counter to a value, and
wherein causing the state of the content token to be modified based on the at least one of the at least one sent packet of the content comprises incrementing the counter.

5. The method of claim 1, wherein the content token indicates an input/output status of the content at the first computing device.

6. The method of claim 1, further comprising:
storing, in a cache of the first computing device, the at least one received packet of the content; and
prior to sending, to the third computing device via the second communication session, the at least one packet of the at least one received packet of the content, retrieving, from the cache, the at least one packet of the at least one received packet of the content.

7. The method of claim 1, wherein the content token comprises a counter,
wherein the first computing device is configured to cause the state of the content token to be modified based on receiving the at least one of the at least one packet of the content by resetting the counter to a value, and
wherein the first computing device is configured to cause the state of the content token to be modified based on the at least one of the at least one sent packet of the content by incrementing the counter.

8. An apparatus comprising:
one or more processors; and
memory storing processor-executable instructions that, when executed by the one or more processors, cause the apparatus to:
receive, from a first computing device via a first communication session, at least one packet of content, wherein a state of a content token is caused to be modified based on receiving at least one of the at least one packet of the content;
send, to a second computing device via a second communication session, at least one packet of the at least one received packet of the content, wherein the state of the content token is caused to be modified based on at least one of the at least one sent packet of the content; and
based on the state of the content token satisfying a threshold, terminate the first communication session.

9. The apparatus of claim 8, wherein the content token comprises a counter,
wherein the processor-executable instructions that, when executed by the one or more processors, cause the state of the content token to be modified based on receiving the at least one of the at least one packet of the content, further cause the apparatus to increment the counter based on receiving the at least one of the at least one packet of the content, and
wherein the processor-executable instructions that, when executed by the one or more processors, cause the state of the content token to be modified based on the at least one of the at least one sent packet of the content, further cause the apparatus to decrement the counter based on the at least one of the at least one sent packet of the content.

10. The apparatus of claim 8, wherein the processor-executable instructions, when executed by the one or more processors, further cause the apparatus to:
based on the second communication session becoming at least one of active or inactive, cause a modification to a state of a device token, wherein the state of the device token indicates a status of the second communication session; and
based on the state of the device token satisfying a second threshold, terminate the first communication session.

11. The apparatus of claim 8, wherein the content token comprises a counter,
wherein the processor-executable instructions that, when executed by the one or more processors, cause the state of the content token to be modified based on receiving the at least one of the at least one packet of the content, further cause the apparatus to reset the counter to a value based on receiving the at least one of the at least one packet of the content, and
wherein the processor-executable instructions that, when executed by the one or more processors, cause the state of the content token to be modified based on the at least one of the at least one sent packet of the content, further cause the apparatus to increment the counter based on the at least one of the at least one sent packet of the content.

12. The apparatus of claim 8, wherein the content token indicates an input/output status of the content.

13. The apparatus of claim 8, wherein the processor-executable instructions, when executed by the one or more processors, further cause the apparatus to:
store, in a cache, the at least one received packet of the content; and
prior to sending, to the second computing device via the second communication session, the at least one packet of the at least one received packet of the content, retrieve, from the cache, the at least one packet of the at least one received packet of the content.

14. One or more non-transitory computer-readable media storing processor-executable instructions that, when executed by at least one processor, cause the at least one processor to:
receive, from a first computing device via a first communication session, at least one packet of content, wherein a state of a content token is caused to be modified based on receiving at least one of the at least one packet of the content;

send, to a second computing device via a second communication session, at least one packet of the at least one received packet of the content, wherein the state of the content token is caused to be modified based on at least one of the at least one sent packet of the content; and based on the state of the content token satisfying a threshold, terminate the first communication session.

15. The one or more non-transitory computer-readable media of claim 14, wherein the content token comprises a counter, wherein the processor-executable instructions that, when executed by the at least one processor, cause the state of the content token to be modified based on receiving the at least one of the at least one packet of the content, further cause the at least one processor to increment the counter based on receiving the at least one of the at least one packet of the content, and wherein the processor-executable instructions that, when executed by the at least one processor, cause the state of the content token to be modified based on the at least one of the at least one sent packet of the content, further cause the at least one processor to decrement the counter based on the at least one of the at least one sent packet of the content.

16. The one or more non-transitory computer-readable media of claim 14, wherein the processor-executable instructions, when executed by the at least one processor, further cause the at least one processor to:

based on the second communication session becoming at least one of active or inactive, cause a modification to a state of a device token, wherein the state of the device token indicates a status of the second communication session; and based on the state of the device token satisfying a second threshold, terminate the first communication session.

17. The one or more non-transitory computer-readable media of claim 14, wherein the content token comprises a counter, wherein causing the state of the content token to be modified based on receiving the at least one of the at least one packet of the content comprises resetting the counter to a value based on receiving the at least one of the at least one packet of the content, and wherein causing the state of the content token to be modified based on the at least one of the at least one sent packet of the content comprises incrementing the counter based on the at least one of the at least one sent packet of the content.

18. The one or more non-transitory computer-readable media of claim 14, wherein the content token indicates an input/output status of the content.

19. The one or more non-transitory computer-readable media of claim 14, wherein the processor-executable instructions, when executed by the at least one processor, further cause the at least one processor to:

store, in a cache, the at least one received packet of the content; and prior to sending, to the second computing device via the second communication session, the at least one packet of the at least one received packet of the content, retrieve, from the cache, the at least one packet of the at least one received packet of the content.

20. A system comprising:

a first computing device configured to:
receive, from a second computing device via a first communication session, at least one packet of content, wherein a state of a content token is caused to be modified based on receiving at least one of the at least one packet of the content;

send, to a third computing device via a second communication session, at least one packet of the at least one received packet of the content, wherein the state of the content token is caused to be modified based on at least one of the at least one sent packet of the content; and based on the state of the content token satisfying a threshold, terminate the first communication session; and the second computing device configured to:
send, to the first computing device via the first communication session, the at least one packet of the content.

21. The system of claim 20, wherein the content token comprises a counter, wherein the first computing device is configured to cause the state of the content token to be modified based on receiving the at least one of the at least one packet of the content by incrementing the counter, and wherein the first computing device is configured to cause the state of the content token to be modified based on the at least one of the at least one sent packet of the content by decrementing the counter.

22. The system of claim 20, wherein the first computing device is further configured to:

based on the second communication session becoming at least one of active or inactive, cause a modification to a state of a device token, wherein the state of the device token indicates a status of the second communication session; and based on the state of the device token satisfying a second threshold, terminate the first communication session.

23. The system of claim 19, wherein the content token indicates an input/output status of the content at the first computing device.

24. The system of claim 20, wherein the first computing device is further configured to:

store, in a cache of the first computing device, the at least one received packet of the content; and prior to sending, to the third computing device via the second communication session, the at least one packet of the at least one received packet of the content, retrieve, from the cache, the at least one packet of the at least one received packet of the content.

* * * * *